United States Patent
Suzuki et al.

(10) Patent No.: US 6,400,752 B1
(45) Date of Patent: Jun. 4, 2002

(54) WIRELESS COMPUTER NETWORK COMMUNICATION SYSTEM AND METHOD WHICH DETERMINES AN AVAILABLE SPREADING CODE

(75) Inventors: Masamitsu Suzuki, Yokohama; Harumi Kokaji, Hino; Satoshi Takahashi, Yokohama; Yoshikatsu Nakagawa, Yamato, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/181,925

(22) Filed: Oct. 29, 1998

Related U.S. Application Data

(63) Continuation of application No. 08/546,544, filed on Oct. 20, 1995, which is a continuation-in-part of application No. 08/536,248, filed on Sep. 29, 1995, now Pat. No. 5,745,483.

(30) Foreign Application Priority Data

Sep. 29, 1994 (JP) .............................. 6-234631
Oct. 20, 1994 (JP) .............................. 6-255035

(51) Int. Cl.$^7$ ................................. H04B 1/69
(52) U.S. Cl. ...................... 375/133; 370/335; 370/344; 370/445
(58) Field of Search ................. 375/130, 132, 375/133; 455/63, 434, 515; 370/335, 344, 445

(56) References Cited

U.S. PATENT DOCUMENTS

| | | | |
|---|---|---|---|
| 5,327,574 A | * 7/1994 | Monma et al. | 455/63 |
| 5,497,505 A | * 3/1996 | Koohgoli et al. | 455/63 |
| 5,613,200 A | * 3/1997 | Hamabe | 455/63 |
| 5,745,483 A | * 4/1998 | Nakagawa et al. | 370/335 |
| 6,178,329 B1 | * 1/2001 | Chao et al. | 455/452 |

* cited by examiner

Primary Examiner—Don N. Vo
(74) Attorney, Agent, or Firm—Oblon, Spivak, McClelland, Maier & Neustadt, P.C.

(57) ABSTRACT

A wireless network communication system and method in which the wireless channel can be determined by selecting a vacant pseudonoise (PN) or spreading code. When communication is started, in order to judge whether a PN code is being employed by another communication group, the degree of correlation between the received signal converted to an intermediate frequency or a base-band frequency by a transceiver and a reference pseudonoise code signal is detected using a correlation circuit within a correlation detector. There is a channel controller which controls the PN code used by the communication terminal which receives an output of the correlation detector which correlates a received channel signal with a reference PN code generated by the PN code generator. If the correlation output signal is not smaller than a threshold value, it is determined that the PN code is to be employed. Furthermore, at the time of transmission, the pseudonoise code generator is controlled so as to supply the selected PN code to a transceiver. The transceiver combines the data to be transmitted with the PN code to be used in order to determine the final signal which is to be transmitted by the terminal.

16 Claims, 25 Drawing Sheets

| PR | HD | "CK" |

PR : PREAMBLE
HD : HEADER
"CK" : CONFIRMATION CODE
(CONTROL CODE)

*FIG. 4A*

| PR | HD | "BS" |

PR : PREAMBLE
HD : HEADER
"BS" : BUSY CODE
(CONTROL CODE)

*FIG. 4B*

| PR | HD | "BS" | b1 | b2 | ---------- | END |

PR : PREAMBLE
HD : HEADER
"BS" : BUSY CODE (CONTROL CODE)
b1, b2, --- : NUMBER OF CODE BEING USED (1~n)
END : PACKET END CODE

*FIG. 11*

| PR | HD | "QT" |

PR : PREAMBLE
HD : HEADER
"QT" : INQUIRY CODE
(CONTROL CODE)

*FIG. 22A*

| PR | HD | "C1" | u1 | u2 | ---------- | END |

PR : PREAMBLE
HD : HEADER
"C1" : CODE OF INFORMATION CODE (CONTROL CODE)
u1, u2, --- : NUMBER OF CODES BEING USED
END : PACKET END CODE

*FIG. 22B*

PR : PREAMBLE
HD : HEADER
CTL : CONTROL CODE
data1, 2, --- : DATA
END : PACKET END CODE

WIRELESS COMPUTER NETWORK COMMUNICATION SYSTEM AND METHOD WHICH DETERMINES AN AVAILABLE SPREADING CODE

CROSS-REFERENCES TO RELATED APPLICATIONS

This application is a continuation of U.S. patent application Ser. No. 08/546,544 filed Oct. 20, 1995, which is a continuation-in-part of commonly owned, application Ser. No. 08/536,248 filed Sep. 29, 1995, now U.S. Pat. No. 5,745,483 entitled "A WIRELESS COMPUTER NETWORK COMMUNICATION SYSTEM AND METHOD", which is incorporated herein by reference.

BACKGROUND OF THE INVENTION

1. Field of the Invention

The present invention relates to a network communication system utilizing wireless communication. The invention more particularly relates to a wireless computer network in which plural groups can perform network communication through different channels at the same time. For example, the above network communication system can be applied to an indoor or mobile wireless communication system.

2. Description of the Related Art

As to known publications describing conventional network communication systems, there exists, for example, Japanese Laid-open Patent Publication No. 6-29981/1994. This publication discloses a local area network (LAN) for receiving signals on a wireless transmission channel. The local area network includes a receiver and a transmitter. In order to realize a LAN with high efficiency, the LAN also includes a received signal level determining apparatus, a threshold level circuit apparatus for generating a level indication signal, and a controller for controlling the operation of the transmitter in accordance with the level indication signal.

Japanese Laid-open Patent Publication No. 5-260051/1993 proposes a wireless system capable of causing the base station to take a role of repeater and smoothly performing the operations of transmitting and receiving signals between the respective terminals by dividing the usable frequency zone into three areas including a message channel, a channel tone Up, and a channel tone Down. The network includes plural wireless terminals and a base station capable of performing the operation of transmitting and receiving the signal between the base station and all of the wireless terminals. This wireless system does not need communication cables connecting each of the terminals.

The wireless LAN described in the specification of Japanese Laid-open Patent Publication No. 6-29961/1994 utilizes the access system (CSMA) in the same manner as used in the popular Ethernet system; that is the wireless LAN of the symmetrical type jointly occupying the same wireless channel at all of the respective terminals. Furthermore, the wireless LAN described in the specification of Japanese Laid-open Patent Publication No. 5-260051/1993 is the wireless LAN with a base station which controls the wireless channel in order to improve the communication throughput.

In recent years, the number of notebook type portable personal computers (PCs) has increased. Furthermore, assuming that the palm-top computer, often called a portable information terminal or data assistant, starts to be used, users of these portable computers will go out from different or the same places and meet together carrying their portable computers and utilize the wireless network regardless of the place where they ordinarily work. In this situation, an environment in which communication can be performed properly is needed. The above-described network including portable computers is referred to as a mobile network.

It seems that there exist many environments in which the above mobile network is adjacently employed for each group of plural users. Further, on many occasions, the frequency of transmitting and receiving the required data in real time such as meeting increases, and thereby the traffic is raised. Consequently, in the wireless LAN as described in the specification of the above Japanese Laid-open Patent Publication No. 5-29961/1994 in which only one wireless channel is used (jointly occupied) by all of the respective terminals, there arises apparently a problem of causing a decrease in throughput.

Furthermore, in the wireless LAN as described in the specification of the above Japanese Laid-open Patent Publication No. 5-260051/1993, since it is necessary to provide a repeater such as the base station, the restriction of the place that the network can be constructed only at the place where the base station is installed arises inevitably.

SUMMARY OF THE INVENTION

Accordingly, it is an object of the present invention to solve the above-mentioned problems.

It is another object of the present invention to provide a wireless network communication system and method for selecting the wireless channel (the PN or spread code) when a group intends to start the communication or during the period of communication in order for different groups of terminals to perform communication at the same time.

The present invention solves the above-described problems by properly selecting the pseudonoise PN code to be used. The PN code can be determined by analyzing each possible PN (spread) code which can be used and determining if the code is vacant. Subsequently, a confirmation packet is transmitted. If another group is using this PN code, the other group will transmit a busy packet indicating that the PN code is not available. Subsequently, the next PN code which was earlier determined to be vacant will be checked.

Alternatively, it is possible to initially determine whether the PN codes are vacant by sensing each of the possible PN codes in different orders by different groups of terminals which can be simultaneously operating. This will reduce the chances of two different groups simultaneously determining that a PN code is available.

As a further alternative, it is possible to randomly check if the PN codes which have been sensed as being vacant are actually vacant. This is done by randomly selecting the vacant codes and transmitting a confirmation packet and waiting for the receipt of a busy packet. If a busy packet is not received, the PN code is determined to be available.

As an alternative to the above-described embodiments, it is possible to sense whether individual PN codes are available and then once a single PN code is determined to be vacant, sending out the corresponding confirmation packet and waiting for the receipt of a busy packet. In contrast, the other embodiments determine each of the vacant codes by analyzing all codes at once. It is also possible for the codes to be sensed such that each group which is to begin communication senses the free channels in different orders. It is also possible to sense the different channels in random orders.

As a further embodiment, all of the vacant PN codes may be determined. As described above, confirmation packets may be sent out and if the PN code is being used, a busy packet may be received. However, instead of simply indicating that the desired PN code is busy, the PN code may include information which describes a code which is vacant and may be used or further checked.

Each of the above-described embodiments has a host terminal of a group perform the checking of the availability of the PN code. Also, it is the host terminal of the other groups which transmit the busy packet. However, it is possible that one of the terminals in the other group may be within communication range of the group desiring to be set-up but the host terminal of that other group is out of communication range of the group desired to be set-up. Accordingly, it is possible to have each of the terminals of the groups which are already communicating monitor for the transmission of the confirmation packet and transmit a busy packet which is received. Thus, if a host terminal of another group is out of range, one or more other terminals within that other group can transmit the busy packet.

As a further alternative, instead of transmitting a confirmation packet, it is possible for the other groups to periodically transmit a busy packet. Thus, there is no need for the group desiring to have its communication set up transmit a confirmation packet as the busy packet will be transmitted by the other groups every predetermined period of time.

As further embodiments, the host terminal of a group desiring to set up communication can attempt to communicate on one of the PN channels. If information is received in response to this communication, the channel is being used by another group and cannot be used. As an alternative, the throughput of the channel being checked can be determined or it can be determined if there is the carrier sensing frequency is greater than a threshold value in order to determine a vacant PN channel. The PN codes may be checked in different orders by different groups desiring to begin communication or alternatively, the different groups desiring to being communication may randomly select the groups to communicate. As a further alternative, the host terminal desiring to start communication for a group may transmit an inquiry packet and receive an information packet in order to determine the code for communication. Further, a correlation value may be sensed for the vacant channels and the inquiry packet can be sent using the PN code which corresponds to the maximum correlation value.

It is another object of the present invention to provide a communication system and method in which a plurality of groups perform network communication at the same time by the use of different wireless channels by preparing plural wireless channels with very small interference and by selecting one wireless channel at the time of constructing the network based on other channels used by other groups.

These and other objects are accomplished by a novel wireless communication network in which groups optionally constructed (ad-hoc) with the plural wireless terminals perform symmetrical type network communication between the respective wireless terminals belonging to a same group. The network communication system is constructed such that when a group performs network communication, any one of the wireless terminals belonging to the group detects the communication channel being employed in one or more other groups, determines the vacant (unused) communication channels, and selects the vacant communication channel to be employed by the above group. Thereafter, the communication channel thus selected is notified at least to the other wireless terminals belonging to the group. After the other wireless terminals confirm the communication channel to be employed by the group members, the symmetrical type network communication is started and uses the above communication channel.

In an embodiment, the communication channel selected for the group is code-divisionally multiplied by the PN (pseudonoise) code individually selected (employed) for the groups. Communication in the same group detects the presence or absence of the spread-spectrum signal of the aforementioned individual PN code, and when the spread-spectrum signal is not detected, the transmitting operation is done.

Therefore, it is possible to provide a wireless system which uses a carrier of a single frequency as the carrier to be employed for transmission, and plural wireless communication groups can coexist with small interference.

As another alternative, the communication channel employed in the groups may be frequency-divisionally multiplied by the frequency individually selected for the respective groups. The communication performed by a group detects the presence or absence of the signal in the aforementioned individual frequency, and when the signal is not detected, the transmitting operation is done.

Consequently, it is possible to provide a wireless system in which by allocating the carriers of plural different frequencies to the respective wireless channels, plural wireless communication groups can coexist with very small interference.

With the present invention, it is possible to provide a wireless system in which the plural groups can perform network communication at the same time using different wireless channels, and in the wireless system thus realized, lowering of the throughput can be suppressed. Furthermore, the network environment can be freely constructed regardless of the place where the network is installed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4a illustrates the construction of a confirmation packet;

FIG. 4b illustrates the construction of a busy packet;

FIG. 11 illustrates an alternative embodiment of a busy packet which contains information of vacant codes;

FIG. 22a is an example of an inquiry code packet;

FIG. 22b is an example of an information code packet; and

DESCRIPTION OF THE PREFERRED EMBODIMENTS

Figure 1:
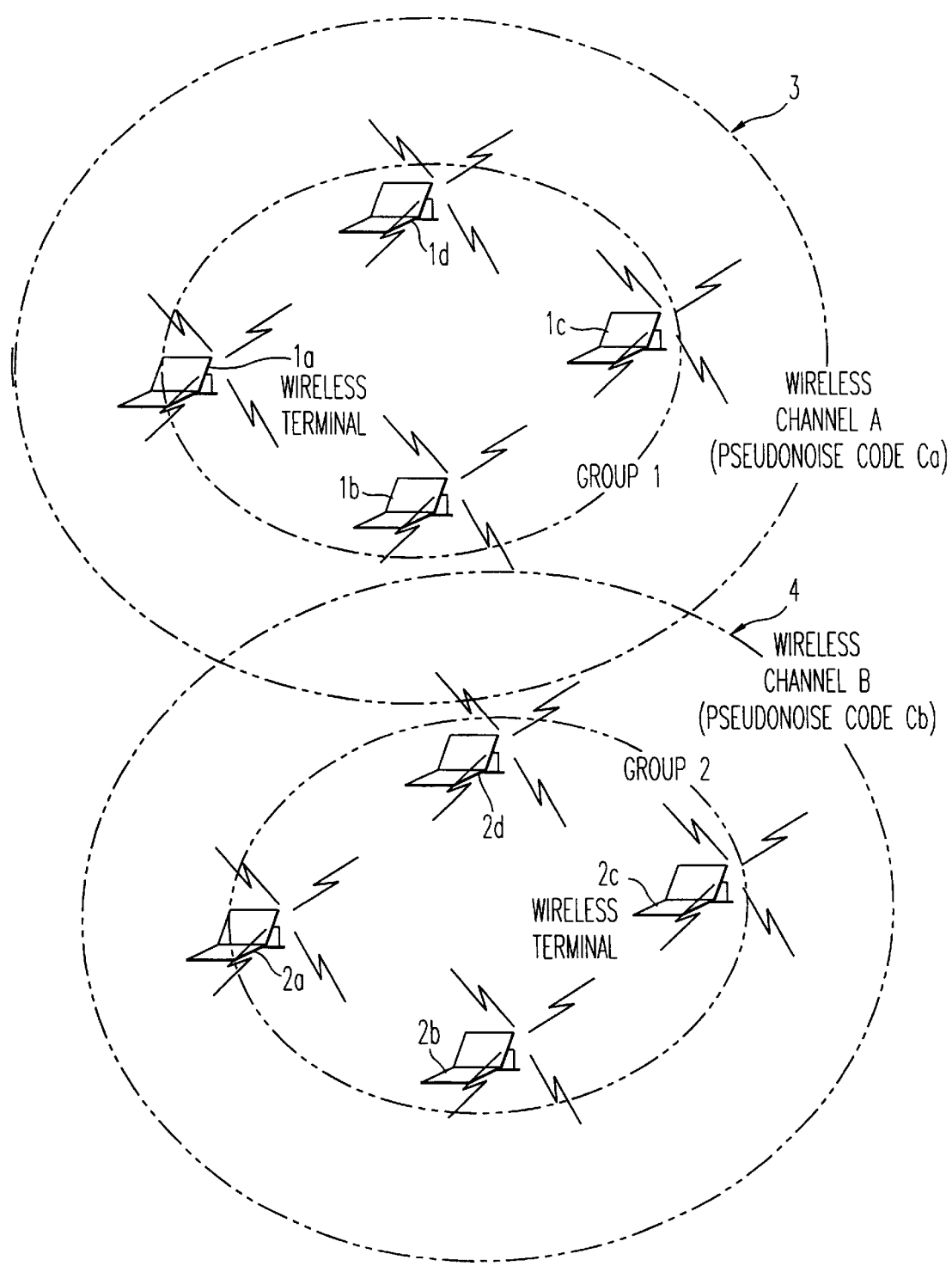
FIG. 1 is a diagram of a network communication system according to the present invention.

Referring now to the drawings wherein like reference numbers designate identical or corresponding parts throughout the several views and more particularly to FIG. 1 thereof, there is illustrated a block diagram of a network communication system which is a wireless local area network. There is a first group of wireless terminals 1a–1d, a second group of wireless terminals 2a–2d, a wireless channel A (which uses a pseudonoise code Ca) designated by 3, and another wireless channel B (which uses a pseudonoise code Cb) designated by 4. The first group of wireless terminals 1a–1d and the second group of wireless terminals 2a–2d make up terminal groups one and two, respectively, and are not in the relationship of a base station and terminal stations, or server and client, but those terminal groups construct a symmetrical type of network when communicating. A symmetrical type network is a type of Local Area Network which does not have abase station and all terminals communicating on the network have equal responsibilities for controlling communication. This may mean that each terminal only controls its own communication once the network is set up. A base station is a terminal which controls the other terminals of the group. The communication over the wireless channels for each group is performed by use of a code-dividing method which employs different pseudonoise (PN) or spread codes for each channel.

Figure 2:
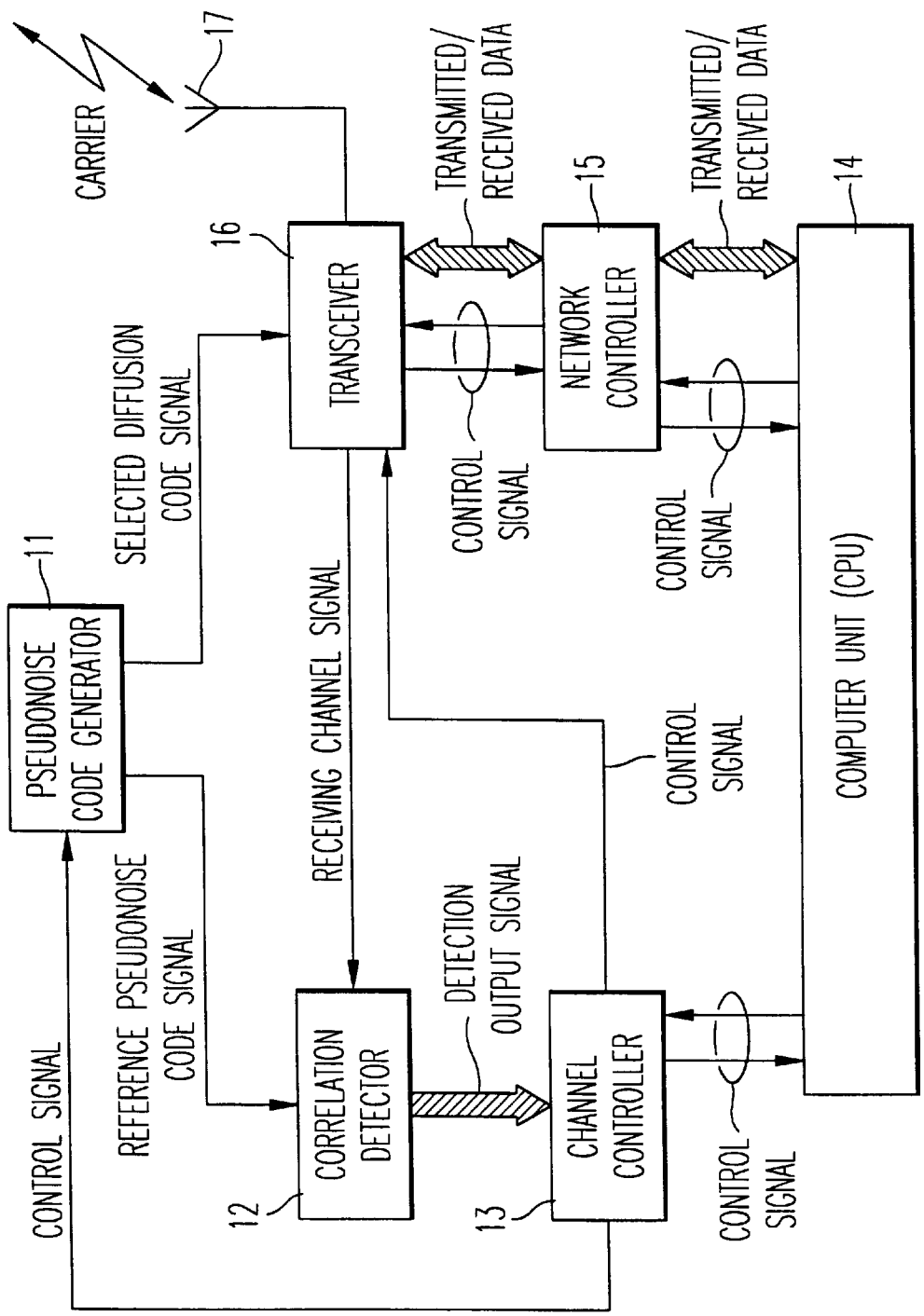
FIG. 2 is a block diagram for explaining an embodiment of a wireless terminal employed by a wireless local area network (LAN) according to the present invention.

FIG. 2 is a block diagram of a wireless terminal used in a wireless network communication system of the present invention. In FIG. 2, there is a pseudonoise (PN) code generator 11, a correlation detector 12, a channel controller 13, a computer unit (CPU) 14, a network controller 15, a transceiver 16, and an antenna 17.

The transmitting/receiving operation will now be explained.

The realization of the protocol such as the control of the transmitting/receiving operation, the selection of the wireless channel, and control of the communication within the group is performed by controlling the network controller 15 and the channel controller 13 under the command of the CPU 14. When transmission is performed, first a transmission start signal is sent to the network controller 15 from the CPU 14, and the transmitted data is simultaneously transmitted from the CPU 14 to the network controller 15. The network controller 15 sets the transceiver 16 to a transmitting mode and the network controller 15 also constructs the data to be transmitted into the desired packet construction which is to be used with the network and sends this data to the transceiver 16.

The transceiver 16 multiples the data signal to be transmitted by the pseudonoise (PN) code generated by the PN code generator 11 in order to perform frequency spreading. Accordingly, the PN code may generically be referred to as a spreading code. Thereafter, the transceiver 16 converts the data signal to a wireless-frequency signal and transmits the data using the antenna 17.

The PN code generator has one or more generators for generating n different PN codes $Ci(i=1,2,\ldots,n)$, and the desired PN code is generated using the appropriate PN code generator. Alternatively, there may be a single PN code generator which generates the different PN codes by reading the codes stored in memory and using the read codes to generate the PN noise. As to the PN or spreading code, a periodic sequence such as an m-sequence is employed generally. For instance, the code having as small cross-correlation as possible is employed just like the preferred pair of the m-sequences.

Next, the operation of receiving signals is explained.

A signal is received from the antenna 17 and the wireless frequency of the signal is converted to an intermediate frequency or a base-band frequency in the transceiver 16. The received signal is inversely spread (or despread) with a PN code generated by the PN code generator 11 in order to demodulate the received signal. The necessary data is taken from the demodulated received signal which is in the form of a packet by the network controller 15 and this data is forwarded to the CPU 14.

At the time of starting communication, it is necessary to select the pseudonoise (PN) or spread code to be employed within the group. The correlation between the received signal converted to the intermediate frequency or the base-band frequency by the transceiver 16 and the reference pseudonoise (PN) code generated by the PN code generator 11 is detected by the correlation detector 12.

When the receiving channel signal is a base-band signal, the correlation detector 12 includes, for example, a multiplier and a low-pass filter. On the other hand, when the received signal is a RF signal or an intermediate frequency signal, the correlation detector 12 uses, for example, a mixer, a band-pass filter, and an envelope detector.

Further, it is also possible to construct the correlation detector by additionally including a matching filter for the respective PN codes. Any one of the methods for obtaining the output of the correlation calculated can be used. The circuit used to calculate or detect the correlation 12 may employ either an analog or digital circuit.

The local reference PN code of the PN code generator 11 is changed by the channel controller 13. The channel controller 13 receives the correlation output signal which is the correlation between the received signal and the local reference code from the correlation detector 12 as a detection output signal. When the correlation output signal is larger than a predetermined threshold, the PN code is judged as "being used", and it is not selected as the spreading code. Further, at the time of signal transmission, the PN code generator 11 is controlled so as to supply the selected PN code to the transceiver 16. Further, the transceiver 16 is itself controlled to be in the proper state of transmitting or receiving the signal with the employed code.

Figure 3:
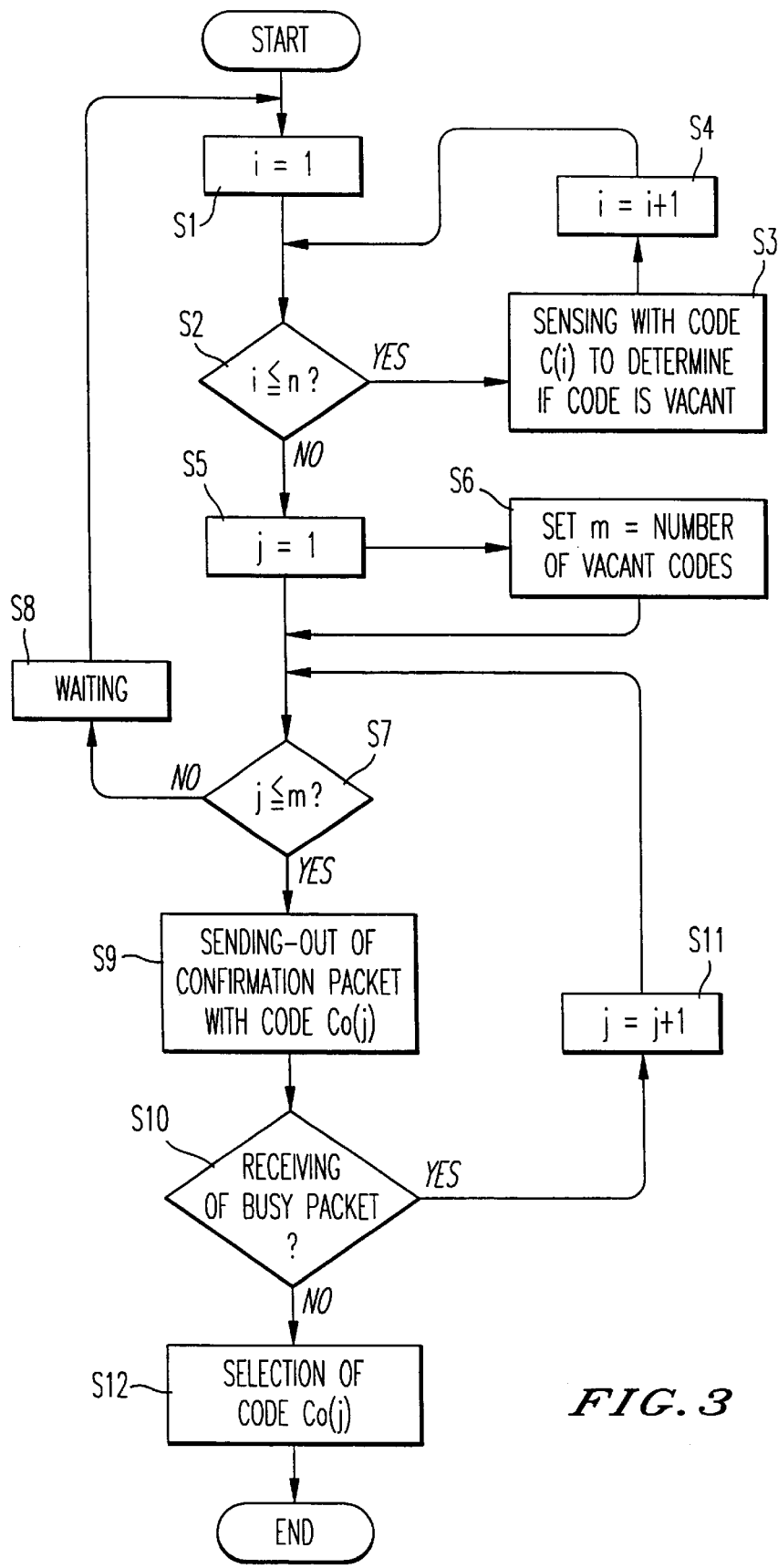
FIG. 3 illustrates a method of selecting a pseudonoise (PN code) according to a first embodiment of the invention by first sensing all vacant codes, sending out a confirmation packet for a vacant code, and waiting for receipt of a busy packet to determine if the code is actually vacant.

FIG. 3 is a flowchart illustrating a method of selecting the PN code according to a first embodiment of the invention. This method is performed by one terminal, called the host terminal, of the group. Initially, the channel controller 13 receives an indication that network communication must be started from the CPU 14 and begins detection of the receiving-channel signal.

The process begins using the first reference PN code (i=1) in step S1. Step S2 then determines if the selected PN code i is less than or equal to n, n being the total number of PN codes to be checked. If step S2 determines that the code is to be checked, flow proceeds to step S3 which senses whether the PN code C(i) is vacant or available. Step S4 increments i by 1 in order to sense the next PN code.

When step S2 determines that all PN codes have been checked (i>n), step S5 sets the counter j=1 and step S6 sets the variable m equal to the number of sensed vacant codes.

Step S7 determines whether j is less than the number of vacant codes m. At this time, the first time performing step S7, if j which is equal to 1 is not less than or equal to m, m must be zero which means that there are no vacant PN codes. Accordingly, flow proceeds to step S8 where the system waits for a predetermined period of time in order for at least one PN code to become vacant.

When at least one PN code is determined to be available, flow proceeds from S7 to step S9 which sends out a confirmation packet using the first available PN code Co(j). If the PN code Co(j) is being used by another group, the host terminal of the group sends out a busy packet indicating that the channel is being employed. When step S10 receives this busy packet, flow proceeds to S11 which increments the counter j. When the busy packet is not received, flow proceeds from S10 to step S12 which selects the PN code to be used Co(j).

The purpose of the transmission of the confirmation packet in step S9 is to confirm that the PN code which was determined to be vacant in step S3 is still vacant because there exists a probability that at the time step S3 was being performed, the other group using the PN code in question temporarily stopped transmission. When the loop of steps S7, S9, S10 and S11 determine that all channels determined to be vacant in step S3, Co(j), j=1,2, ... m, step S7 will determine that all PN codes have been checked and flow will proceed to step S8 which waits for a predetermined period of time before again sensing vacant unused codes. Thereafter, the procedure beginning with step S1 can be performed. Alternatively, the procedure can simply be stopped instead of performing step S8.

An example of the confirmation packet transmitted in step S9 is illustrated in FIG. 4a. The confirmation packet in FIG. 4a contains a preamble PR, a header HD, and a confirmation code which is a control code "CK." The preamble PR is a signal for inversely spreading the PN code and taking the synchronism from information in the preamble such as a bit during the demodulation of data. The group and individual information, along with any other desired information, is contained in the header HD. After the header is a control code and for the confirmation packet, the control code may be set to "CK" and ordinary or normal data may be stored thereafter. For a confirmation packet, it is not necessary to include any data after the confirmation code and accordingly, it is not necessary to include any data in addition to the confirmation code "CK."

FIG. 4b illustrates a busy packet which may be transmitted by a host terminal of another group in response to the transmission of the confirmation packet in step S9 of FIG. 3. The busy packet is similar to the confirmation packet illustrated in FIG. 4a except that the control code which is the third field illustrated in the packet indicates a busy code "BS" instead of the confirmation code illustrated in FIG. 4a.

Figure 5:
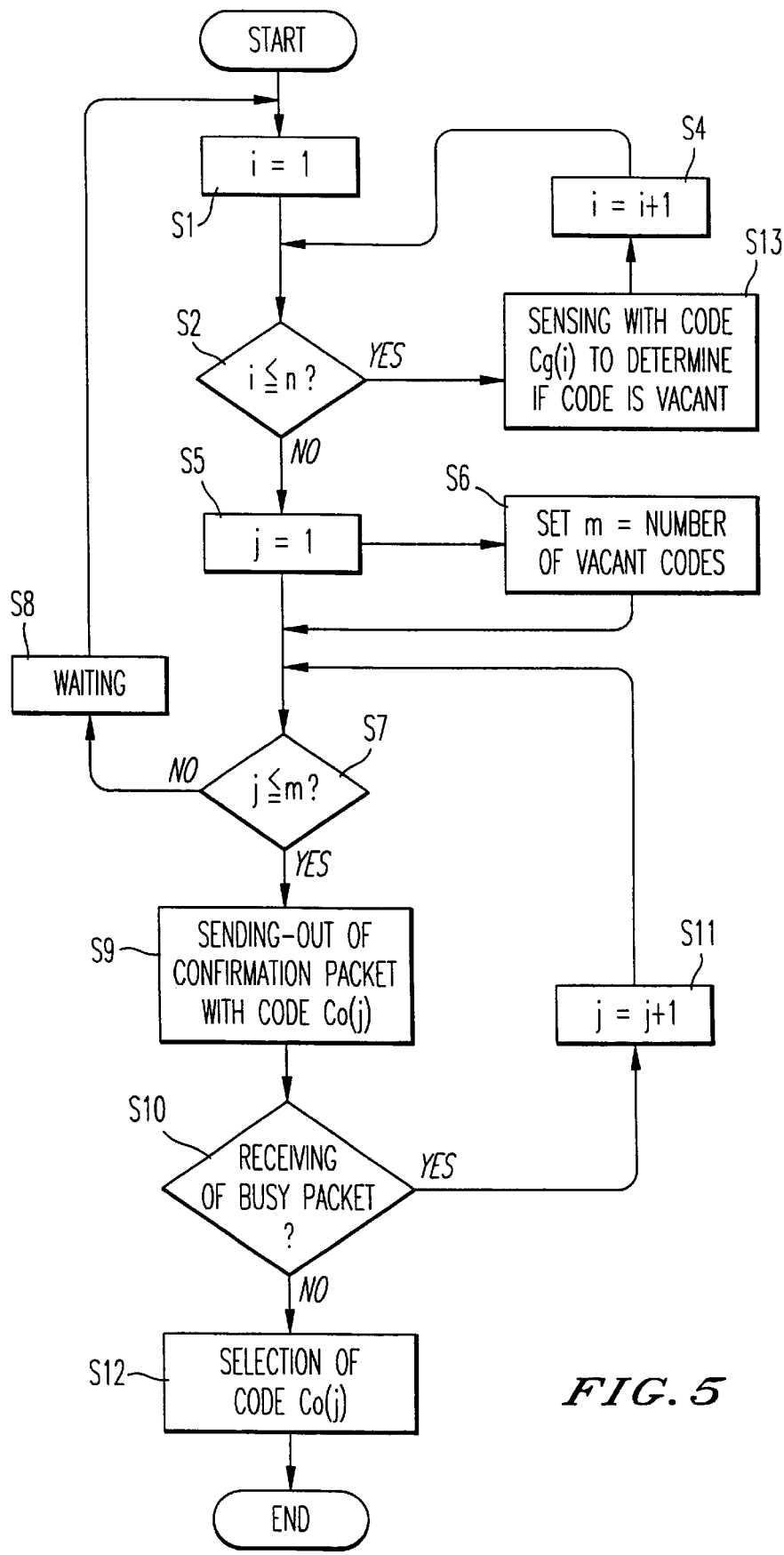
FIG. 5 illustrates a method of determining each of the vacant PN codes and is similar to FIG. 3 except that each group senses the vacant codes in different predetermined orders.

FIG. 5 illustrates a process used to determine a vacant PN code according to the second embodiment of the invention. The process of FIG. 5 is the same as the process illustrated in FIG. 3 except for step S14 is performed in FIG. 5 instead of S3. Accordingly, a detailed description of each of the steps except for step S14 will be omitted for brevity.

In step S3 of FIG. 3, each of the PN codes C(i) are sensed in a fixed order. However, in step S13 of FIG. 5, the sensed codes Cg(i) are in a different order for each of the groups. For example, the members of Cg(i) of one group are not the same as Cg(i) of another group but Cg(1) of group 1 may correspond to Cg(n) of group 2, Cg(2) of group 4 may correspond to Cg(n−1) of group 2, or the correspondence may be scrambled in any manner. However, the number of members of each Cg(i) will usually be the same. Since the order of sending out the confirmation packets in order to detect the vacant or unused PN code is different for each group as described above, when plural groups intend to start communication at the same time, only on very rare occasions will some confirmation packets be sent out having the same vacant PN code.

Figure 6:
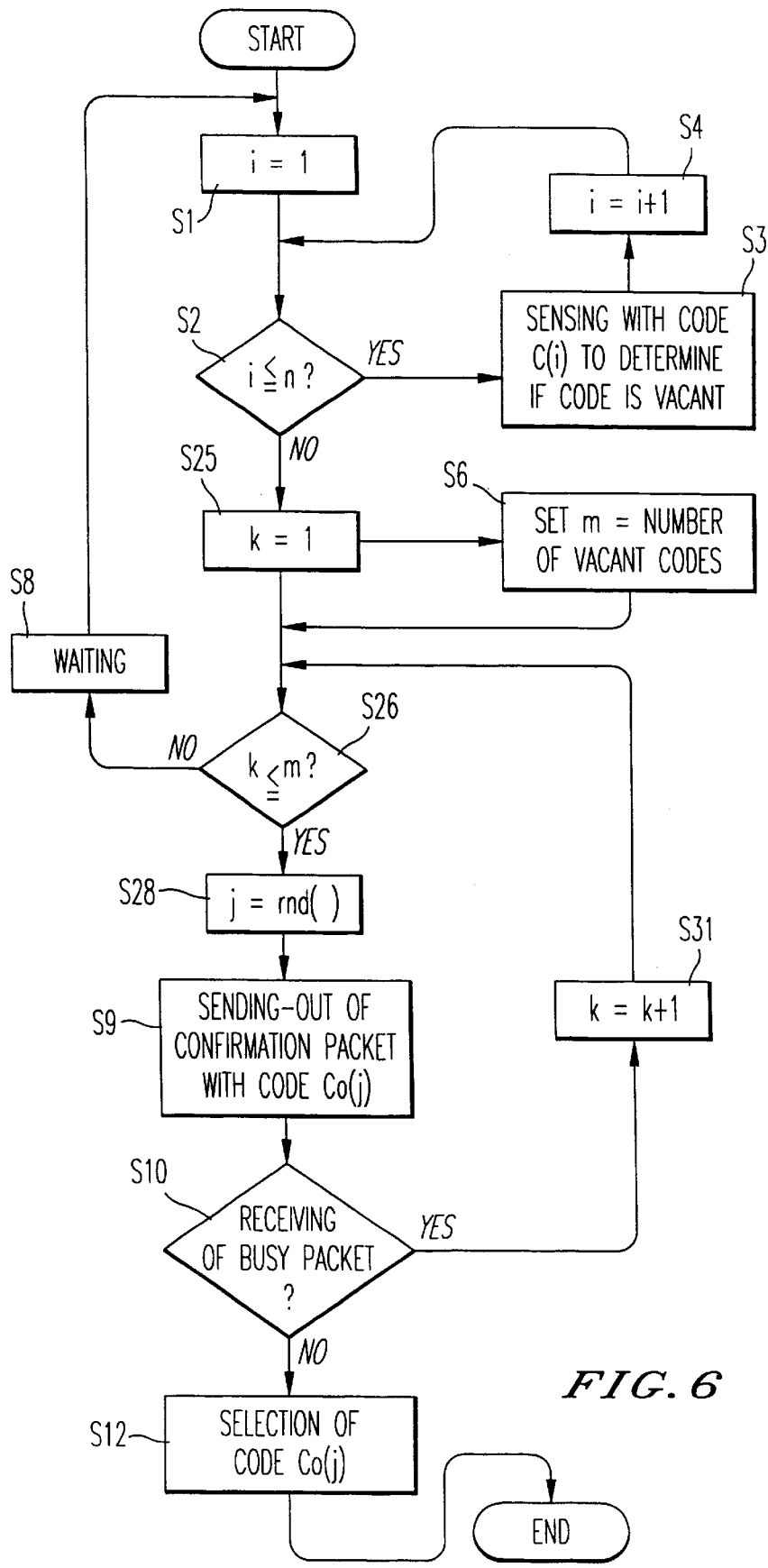
FIG. 6 illustrates a method for determining vacant codes by randomly selecting a PN code to be analyzed to determine if it is available.

FIG. 6 illustrates a flowchart of the third embodiment of the invention which selects a vacant PN channel to be used by the communication group. The method of FIG. 6 is similar to the method of FIG. 3 and steps having the same reference numeral will not be described for brevity. The third embodiment illustrated in FIG. 6 differs from the first embodiment illustrated in FIG. 3 in that after all of the vacant PN codes are determined by steps S1 through S4, the code which is actually selected for use by the group is selected at random.

In step S28 of FIG. 6, j is randomly determined from among the set 1,2 . . . m. However, each time the loop of steps S26, S28, S9, S10 and S31 is performed, j is different because each j can only be selected once. By doing so, it is possible to select a vacant code from among the m codes which have been determined to be vacant. Accordingly, when plural groups start communication at the same time, it will seldom occur that the confirmation packet is sent out by different groups which have the same vacant PN code.

Figure 7:
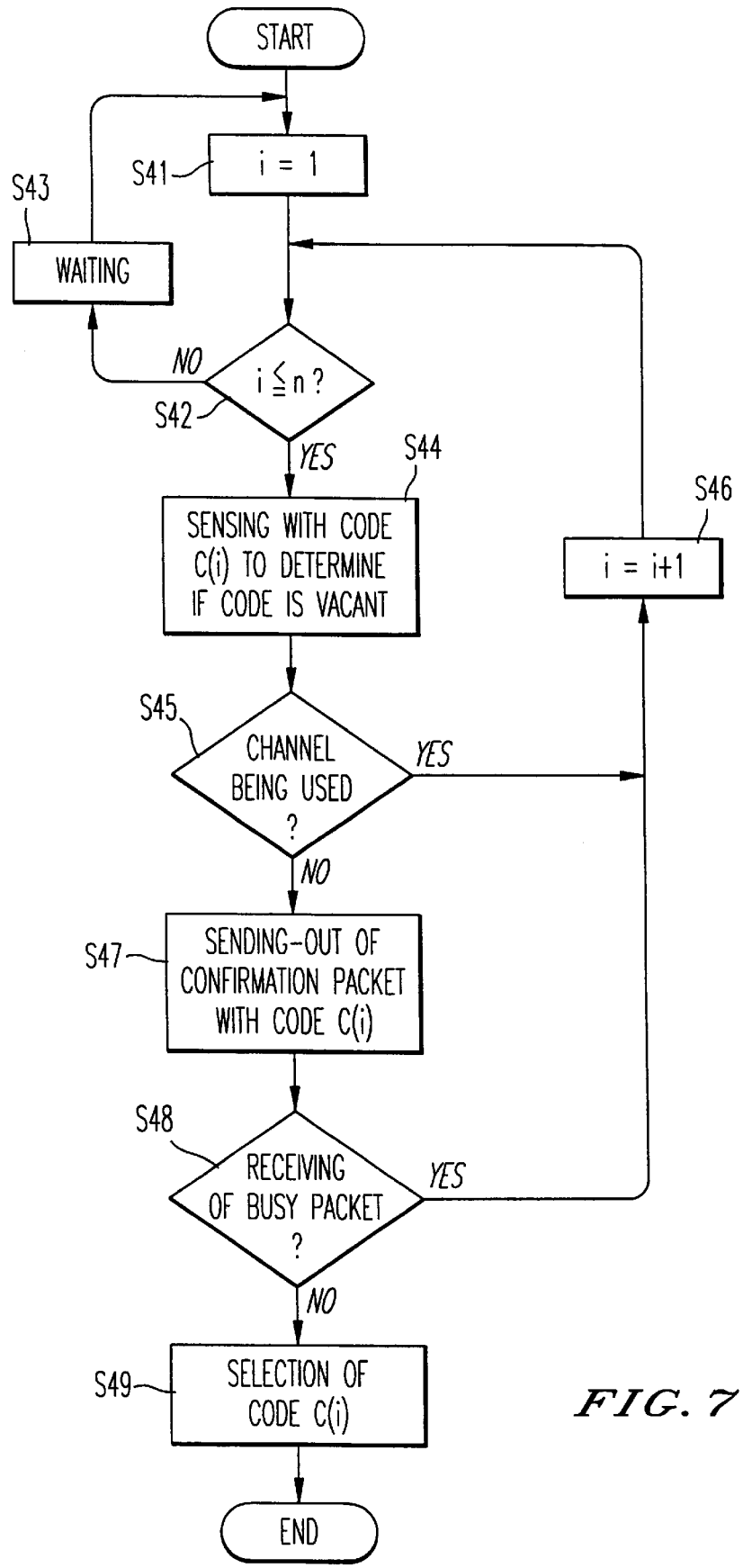
FIG. 7 illustrates a flowchart for determining a vacant PN code by sensing, for one code at a time, whether the PN code is vacant and immediately thereafter sending out a confirmation packet for that code which was determined to be vacant.

FIG. 7 illustrates a flowchart of the fourth embodiment of the invention. This flowchart is similar to the first embodiment illustrated in FIG. 3 except that in FIG. 7, as soon as a vacant code is sensed, a confirmation packet is sent out confirming whether or not the PN code is still vacant. Contrary to this, the first embodiment illustrated in FIG. 3 initially finds all of the vacant PN codes and then sends out confirmation packets until a busy packet is not received.

After starting in FIG. 7, the variable i is set equal to 1 in step S41, indicating that the first PN code is to be checked. Step S42 then determines if i is less than or equal to n, the total number of PN codes which are available. As i is equal to 1 and there must be a plurality of PN codes to be checked, flow proceeds to step S44 which determines whether the PN code C(i) is being used. If the channel is in fact being used, flow proceeds from S45 to step S46 which increments i so that the next code C(i+1) is sensed. When each of the codes PN have been sensed as being busy, flow proceeds from step S42 to step S43 which waits for a predetermined period of time in order for a vacant PN code to become available. If step 45 determines that a channel is not being used, flow proceeds to step S47 which sends out a confirmation packet with the code C(i). If step S48 receives a busy packet, the PN code is unavailable and flow proceeds to steps S46 and S42. When step S48 does not receive a busy signal, step S49 selects the code C(i) which is to be used in the group. The process then ends.

Figure 8:
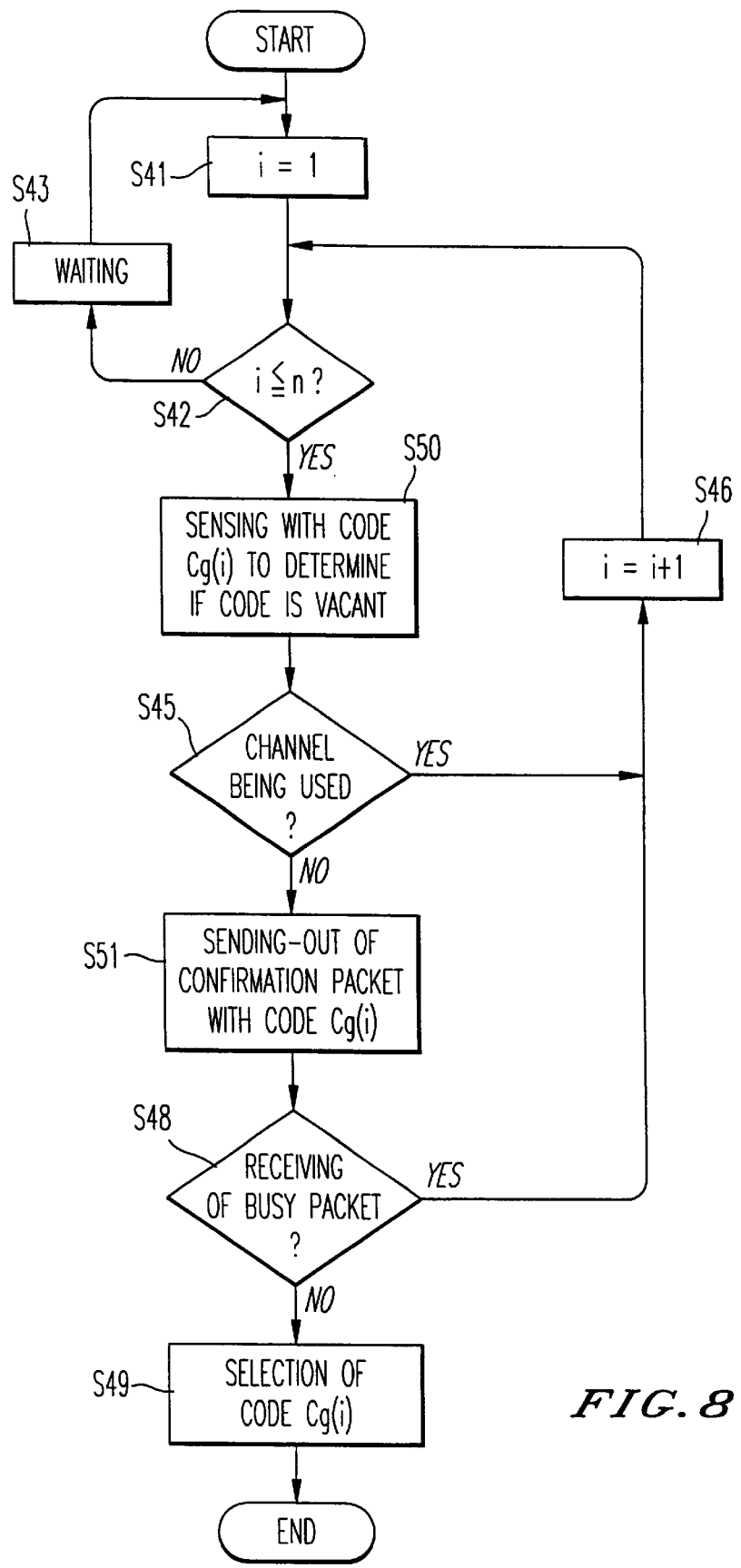
FIG. 8 is a flowchart for determining a vacant PN code and is similar to the process of FIG. 7 except the host terminal of each group is assigned a different predetermined order for examining vacant channels.

FIG. 8 is a flowchart illustrating the fifth embodiment of the invention which is similar to the fourth embodiment illustrated in FIG. 7 except that steps S44 and S47 of FIG. 7 have been changed to steps S50 and S51, respectively. Steps S50 and S51 respectively sense and transmit the code Cg(i). As explained above with respect to S14 of FIG. 5, the orders of sensing the PN codes Cg(1), Cg(2), . . . Cg(n) are different for the various groups. Since this order is different, when plural groups start communication at the same time, it will be very rare that the same confirmation packets are sent out having the same vacant (unused) code.

Figure 9:
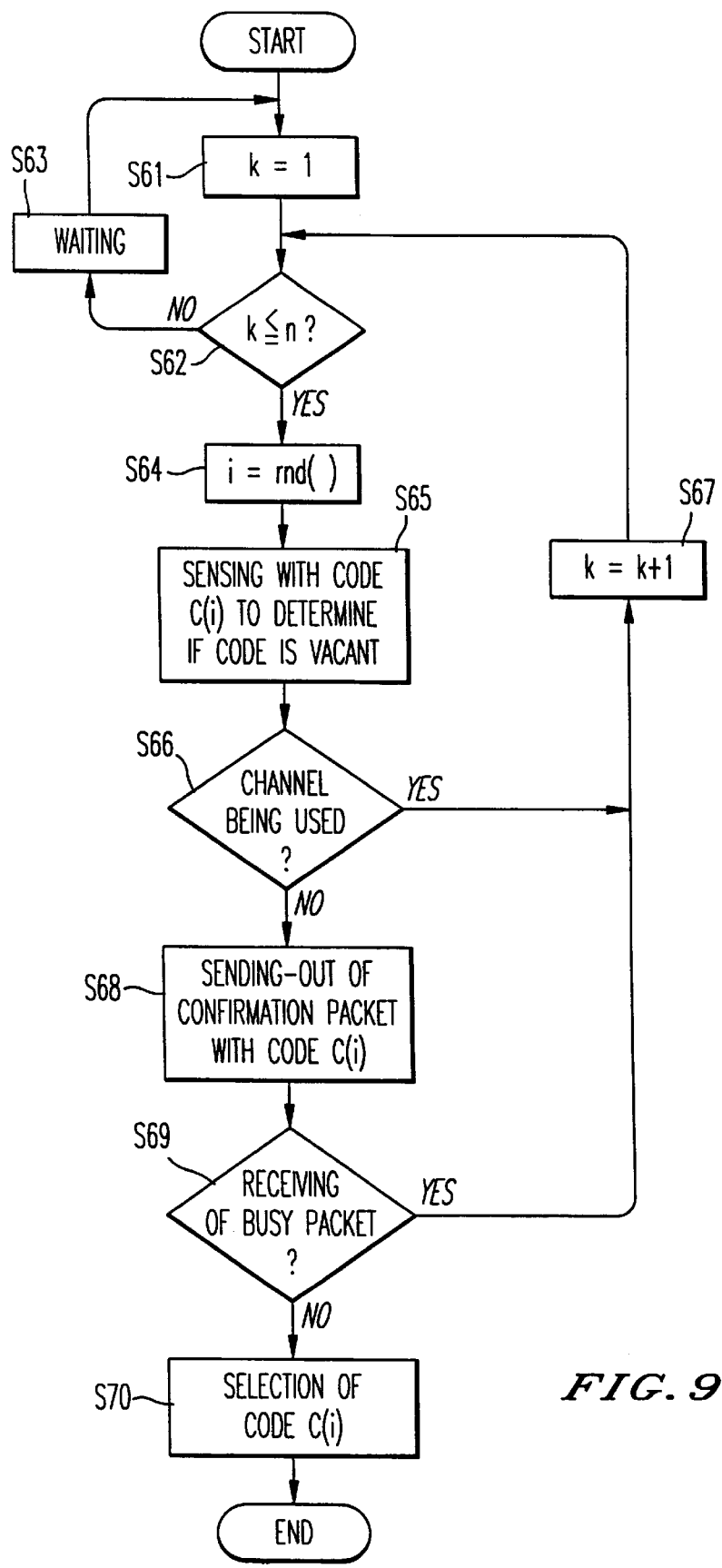
FIG. 9 is similar to the flowcharts of FIGS. 7 and 8 for determining vacant PN codes except that the codes are examined in a random order.

FIG. 9 illustrates the sixth embodiment of the invention for selecting the PN code which is to be used by a group of terminals. This embodiment uses the rnd( ) function described in step S28 of FIG. 6. The rnd( ) function of step S64 of FIG. 9 selects an integer i at random where i=1,2 . . . , n). The same integer can be selected only once. By using the rnd( ) function, it is possible to select a vacant (unused) code among the n vacant codes C(i), i=1,2, . . . n. Therefore, when a plurality of groups starts communication at the same time, it will rarely occur that a confirmation packet is sent out using the same vacant (unused) code.

Figure 10:
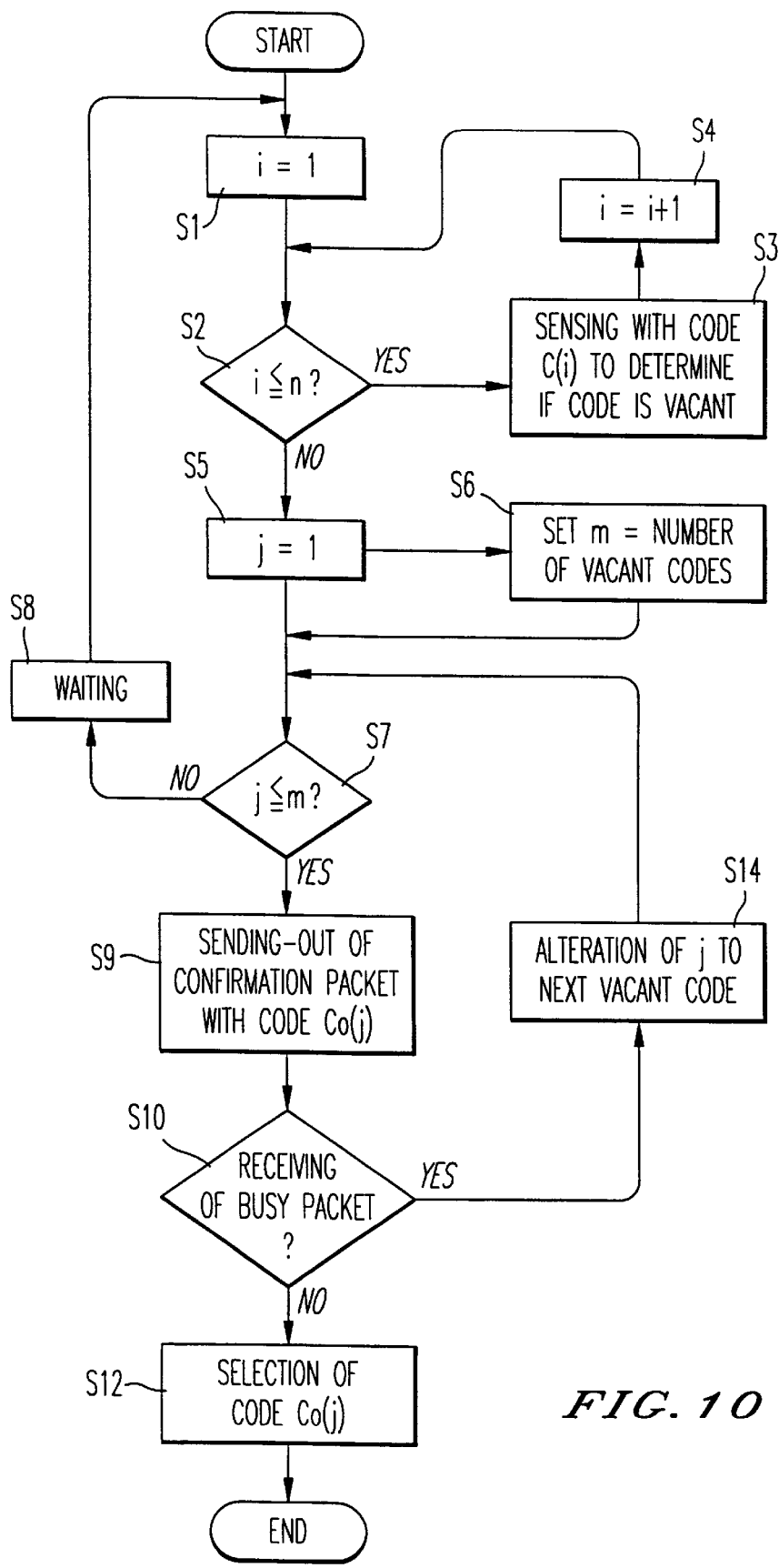
FIG. 10 is a flowchart for determining a PN code to be used and in which busy packets from other groups transmit information indicating the next vacant code.

FIG. 10 illustrates a seventh embodiment of the invention used for selecting a vacant PN code.

In the first through sixth embodiments illustrated in the flowcharts of FIGS. 3, and 5–9, respectively, a "busy packet" is sent out by other groups which includes code information known in the other groups and being used at present. Accordingly, the first through sixth embodiments are able to select an unused code depending on whether a busy packet is received or not.

In the embodiment illustrated in FIG. 10, the busy packet may have the structure illustrated in FIG. 11 which contains the fields b1, b2, . . . Therefore, the busy packet can include in the packet as illustrated in FIG. 11, a designation of each of the known busy PN codes. If the flowchart of FIG. 10 receives a busy packet in step S10, the vacant codes may be determined and the host terminal performing the method of FIG. 10 in step S14 will change j to a next vacant code which was determined based on the received busy packet.

Step S14 modifies the first embodiment illustrated in the flowchart of FIG. 3. However, the teachings of using the next vacant code based on the received busy packet such as the packet illustrated in FIG. 11 can also be applied to the systems of the second through sixth embodiments in a similar manner. When the teachings of step S14 and the busy packet illustrated in FIG. 11 are applied to any of the first through third embodiments, it happens on only very rare occasions or never happens that the confirmation packet is sent out on a PN code which is being used by another group. Further, when the teachings of step S14 and the embodiment of FIG. 10 are applied to the fourth through sixth embodiments, the sensing of the code being employed in the sending out of the confirmation packet do not need to be performed.

Figure 12:
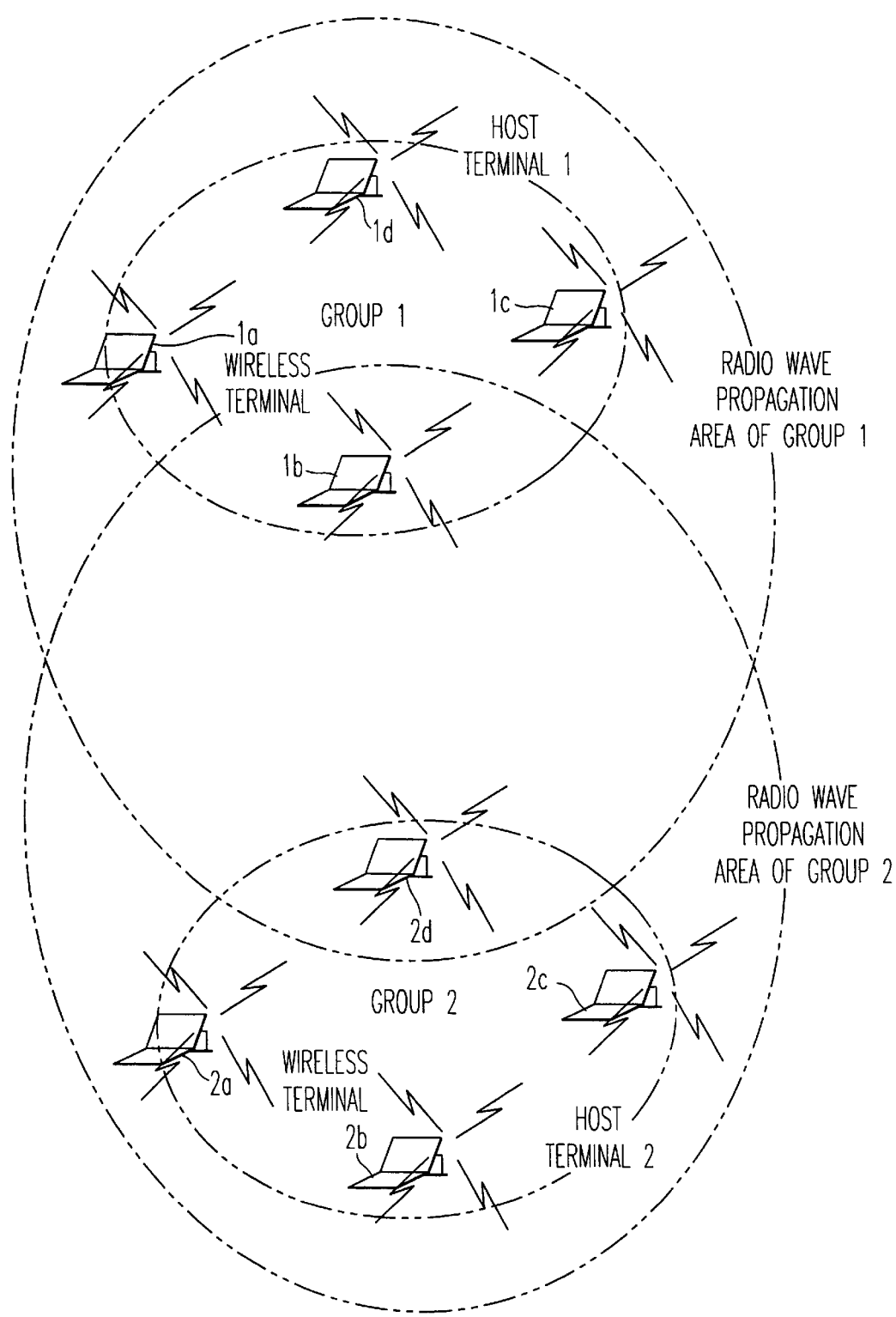
FIG. 12 is a diagram of a network communication system in which the radio wave propagation area of 1 does not include each of the terminals of the area of group 2.

The eight embodiment of the invention will be explained with respect to FIG. 12. In FIG. 12, which is similar to the system illustrated in FIG. 1, it is seen that the host terminal for Group 1 is the terminal 1d which is out of the communication range of the radio wave propagation area of Group 2. If only the host terminal 1d sends out a busy packet within Group 1, even though a specific PN code is desired to be used by Group 2, a busy packet will not be sent from the host terminal 1d because the host terminal id never receives the confirmation packet from Group 2. Further, on some occasions it is possible that the host terminal such as the host terminal 1d of another group such as Group 1 cannot receive the confirmation pack for some reason or may be unable to transmit a busy packet. These problems are solved by having each of the terminals within each group which receives the confirmation packet to transmit the busy packet. This idea may be applied to each of the first through seventh embodiments.

Figure 13:
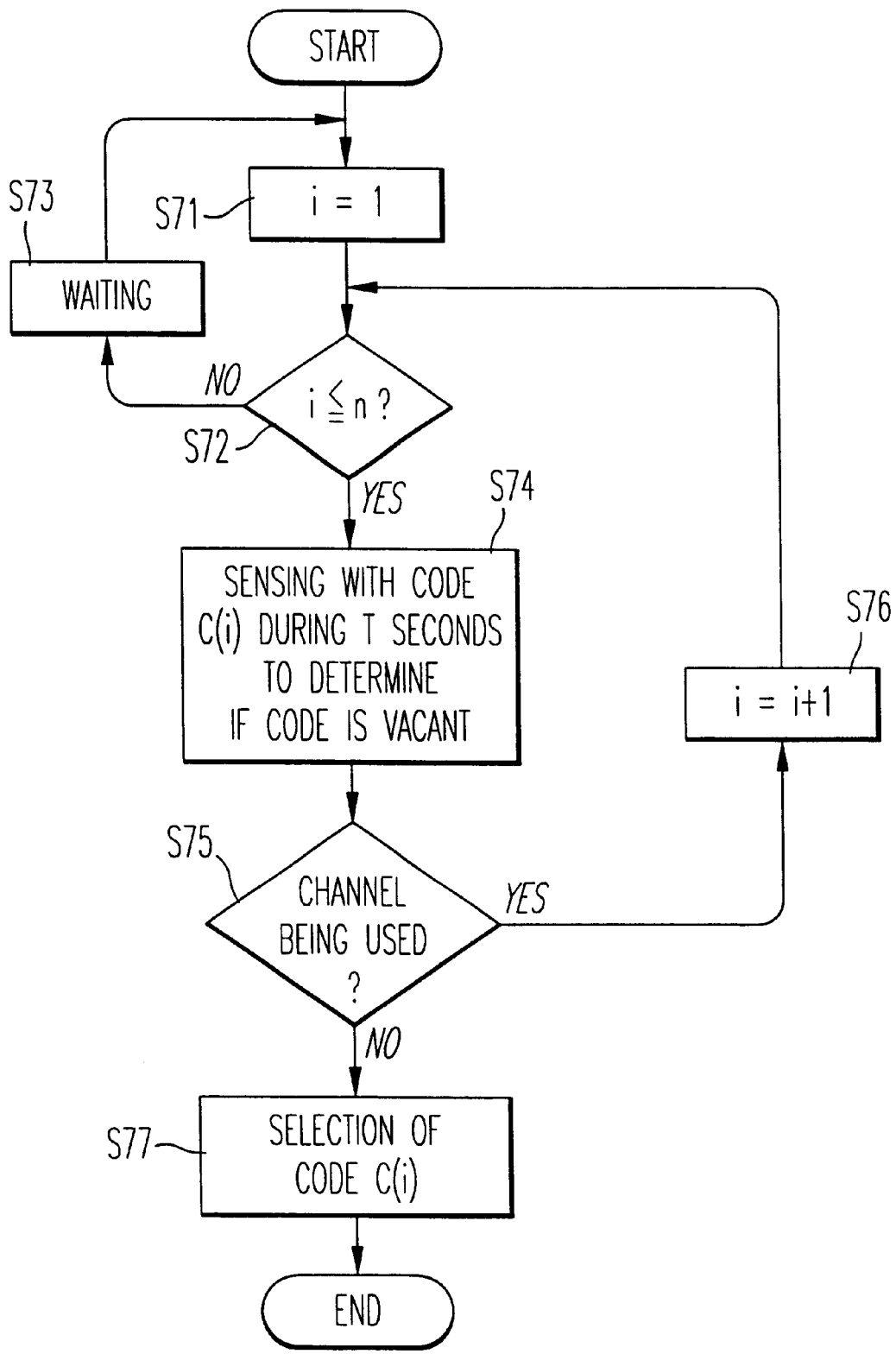
FIG. 13 illustrates a process of determining a PN code to be used without transmitting a confirmation packet.

The ninth embodiment of the invention will now be explained with respect to FIGS. 13 and 14. FIG. 13 illustrates a process for determining a vacant PN code. This embodiment contains steps which have the same description as the steps of FIG. 3. However, it can be seen that there is no sending of a confirmation packet as illustrated in each of the first through seventh embodiments. This is because the sensing step S74 can definitively determine whether the PN code is vacant without the transmission of a confirmation packet, because of the transmitting characteristics of the terminals of the other groups. The transmission process is explained with respect to the flowchart of FIG. 14.

Figure 14:
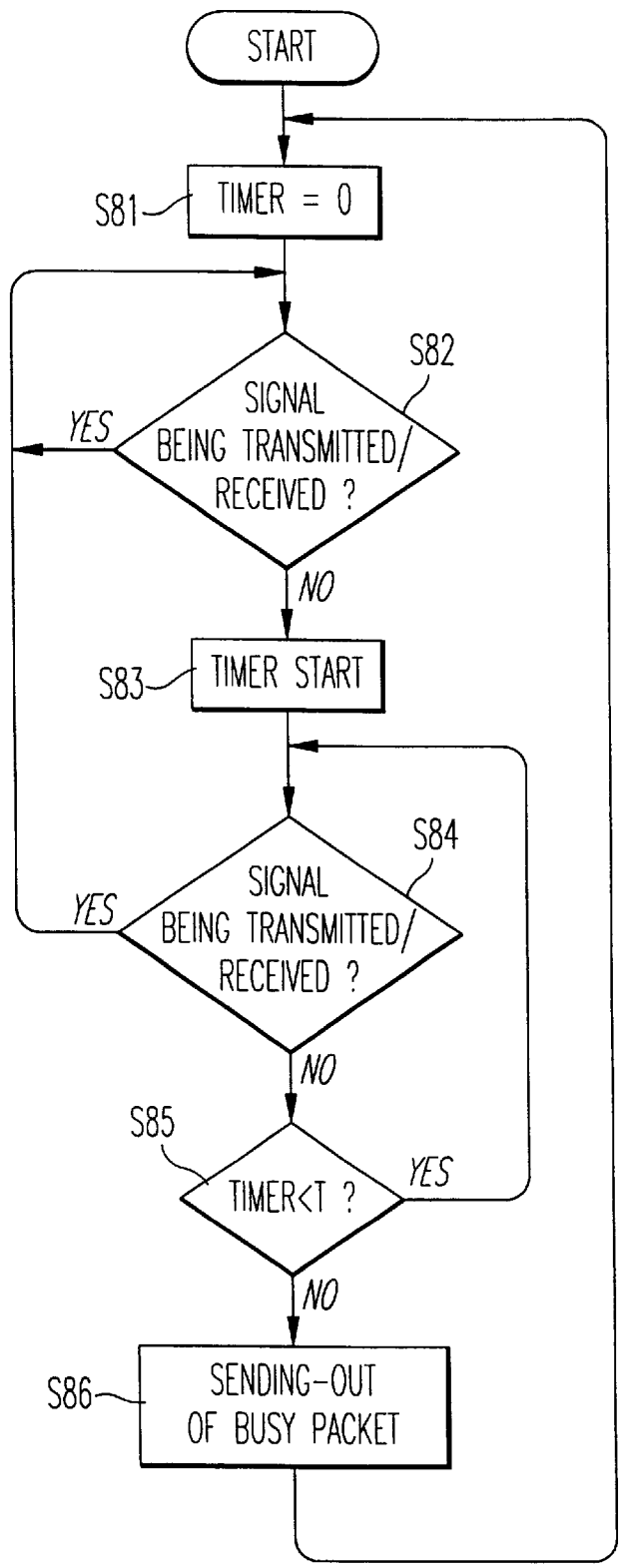
FIG. 14 illustrates a process to be used by other groups when the host terminal of the group beginning communication according to the process of FIG. 13 is performed by having the other groups transmit a busy packet every predetermined period of time when other communication is not being performed.

The flowchart of FIG. 14 illustrates a method performed by the host terminals of the other group which are currently performing communication. The host terminal of each of the other groups has a timer and this timer is set equal to zero in step S81. When the host terminal in step S82 determines that there is no signal being transmitted or received by the group, the timer is started in step S83. When step S84 determines that a signal is not being transmitted or received by the group, step S85 determines whether the timer is less than a predetermined time T. If it is not, step S86 sends out a busy packet in order to indicate to other groups that the PN code used by this group is actually in use. As an alternative to the method illustrated in FIG. 14, when there is a "YES" answer from either of steps S82 or S84, flow may return to step S81 which resets the timer to zero. Additionally, the timer may be stopped at this point. The busy packet which is transmitted by step S86 may be as illustrated in FIGS. 4b or FIG. 11. The flowchart of FIG. 14 assures that there is transmission from the group every predetermined period of time T when normal communication of the group no longer exists in order to inform the other groups that the PN channel being used by the group is not vacant. As explained above, this eliminates the need for the host terminal which is starting communication for another group to send out confirmation packets and in order to request other groups transmit a busy packet.

According to the tenth embodiment of the invention, each terminal of a group performing communication executes the transmission of a busy packet according to the flowchart of FIG. 14 in contrast to just the host terminal performing the process of FIG. 14 as explained with respect to the ninth embodiment. Referring back to FIG. 12, if the host terminal 1d cannot receive radio wave propagations of Group 2 and also cannot transmit to Group 2, the method of the ninth embodiment illustrated in FIG. 14 may not properly work. Therefore, by having each of the terminals in each group perform the process of FIG. 14 and not just the host terminal, it is not necessary to send out a confirmation packet and the busy packet will always be received with reliability, even if the host terminal cannot communicate with the host terminal of another group.

Figure 15:
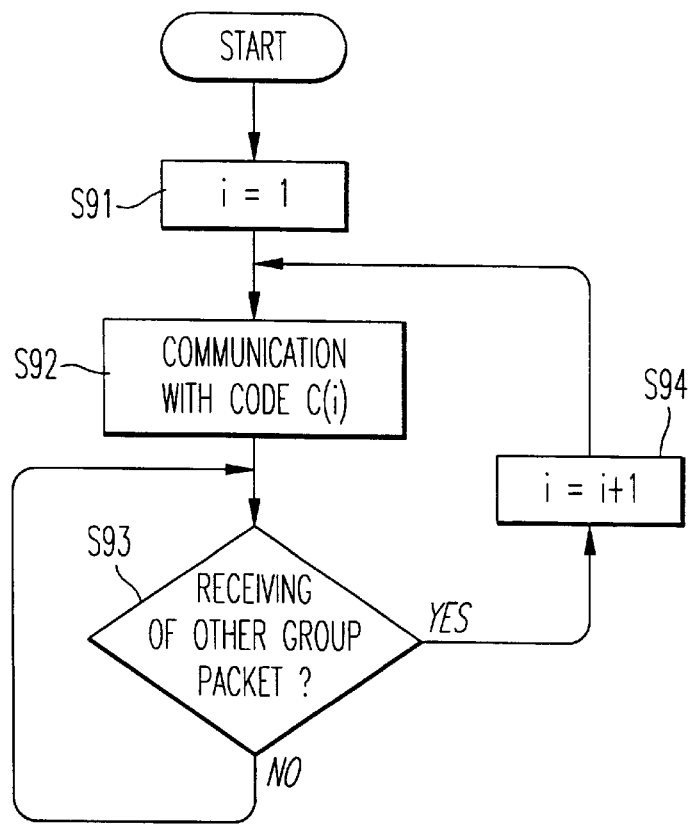
FIG. 15 is another flowchart showing the method of selecting the PN code according to the present invention.

FIG. 15 illustrates the eleventh embodiment of the invention used to select a PN code used for communication within a group. After starting, the host terminal selects a PN code corresponding to i=1. Step S92 then starts communication using the PN code C(i) code in an attempt to see if other terminals of other groups will respond to this code. If step S93 detects a packet is received from another group, i is incremented by 1 in step S94. Whether the received packet is from the group of the host terminal or from a different group can be judged by the information of the group or of an individual person.

Figure 16:
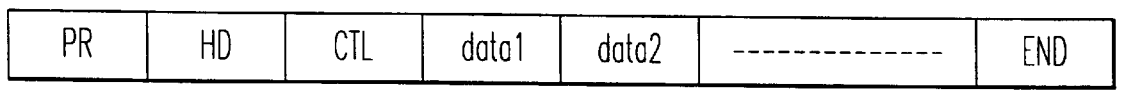
FIG. 16 is a diagram showing another example of a packet format according to the present invention.

FIG. 16 shows the arrangement of a packet signal in which the group or personal information is stored in the header portion HD. The field CTL stores the control code.

As an alternative to the process illustrated in FIG. 15, when step S93 does not receive a packet from another group, the process may end as a PN code has been found which does not result in a response from another group.

Figure 17:
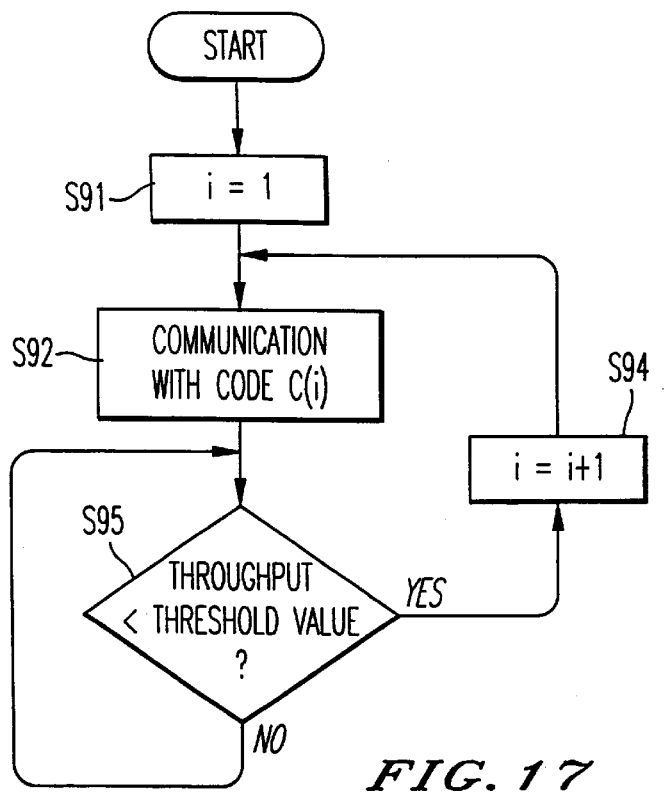
FIG. 17 is still another flowchart showing the method of selecting the pseudonoise (PN) code according to the present invention.

Next, the twelfth embodiment of the invention is explained with respect to FIG. 17. FIG. 17 is a flowchart showing a method for selecting the PN code. As explained with respect to the eleventh embodiment, the PN code is changed at the time of receiving the packet of another group, for example, by step S94 of FIG. 15. However, in the twelfth embodiment, the throughput during the period of communication is monitored by the CPU. When the throughput becomes less than a predetermined threshold in step S95, the code is then changed by incrementing the index i in step S94. When the interference of the packet in the other group becomes larger when the interference or the noise increases unexpectedly, the throughput level is lowered. Consequently, the throughput can be equal to or more than the predetermined constant value.

Figure 18:
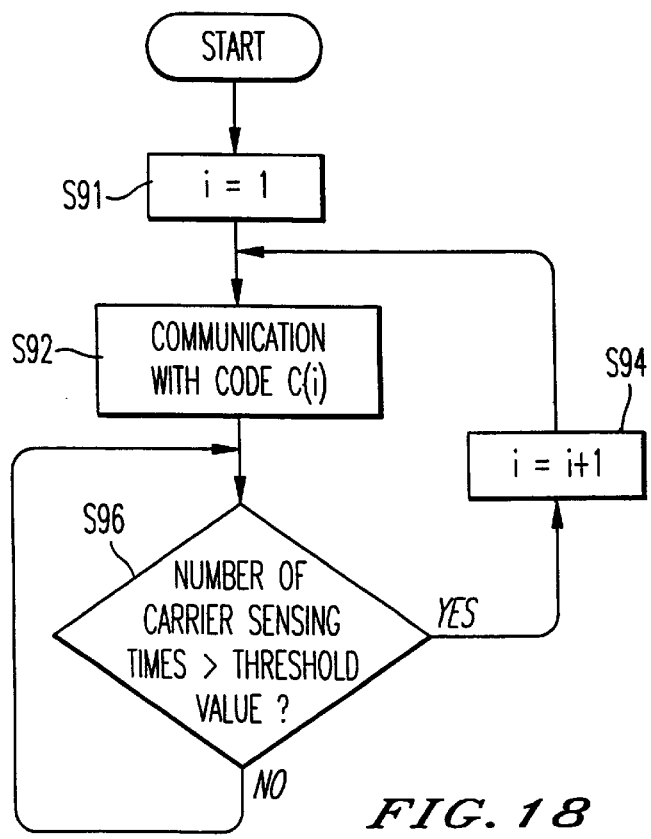
FIG. 18 is still another flowchart showing the method of selecting the pseudonoise (PN) code according to the present invention.

Next, the thirteenth embodiment of the invention is explained with respect to FIG. 18. In the system explained with respect to the eleventh embodiment, when the code is changed, the number of the frequency of the carrier sensing is monitored. When the frequency of the carrier sensing exceeds a predetermined threshold, as determined by S96, the index i is incremented by step S94. Since the communication in the group is performed with CSMA (Carrier Sense Multiple Access) when the host terminal intends to transmit, carrier sensing is performed. However, in the case that the other group employs the same code, the frequency number of the carrier sensing increases sharply. Consequently, when the frequency number of the carrier sensing becomes large, the other group employs the same code. Otherwise, since it seems that the communication with that code is performed with difficulty for some reason, the code is also changed.

Figure 19:
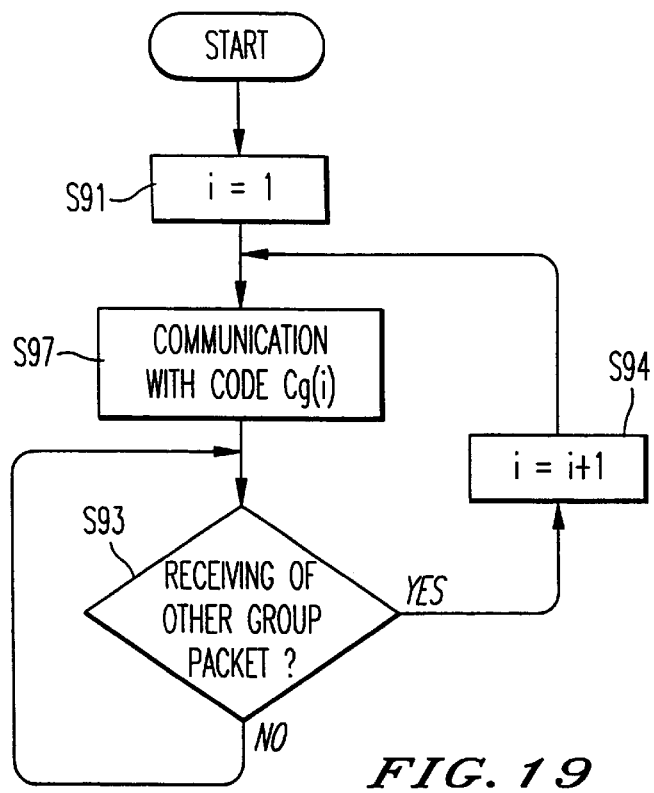
FIG. 19 is still another flowchart showing the method of selecting the pseudonoise (PN) code according to the present invention.

Next, the fourteenth embodiment of the invention is explained with respect to the flowchart of FIG. 19 showing a method for selecting the PN code. According to the present invention, the order of changing the code in the systems shown in the eleventh through thirteenth embodiment is changed for each of the respective groups. FIG. 19 shows the order of changing the code applied to the eleventh embodiment. It is also possible to apply this teaching to the twelfth or thirteenth embodiments. The code Cg(i) represents the code having the order determined for each of the respective groups. In the systems of the eleventh through thirteenth embodiments, since any group starts the communication with the same code and the order of changing the code is the same, the same code may be employed on many occasions. Consequently, if the order thereof is changed differently for each group, the frequency (probability) of such occurrence of choosing the same code can be made very small. The function Cg(i) is the same as the function Cg(i) discussed above with respect to the other embodiments. Each of the groups employed with respect to FIG. 19 may have their own Cg(i) function which differ from each other in order to make the probability of using the same code by the different groups small.

Figure 20:
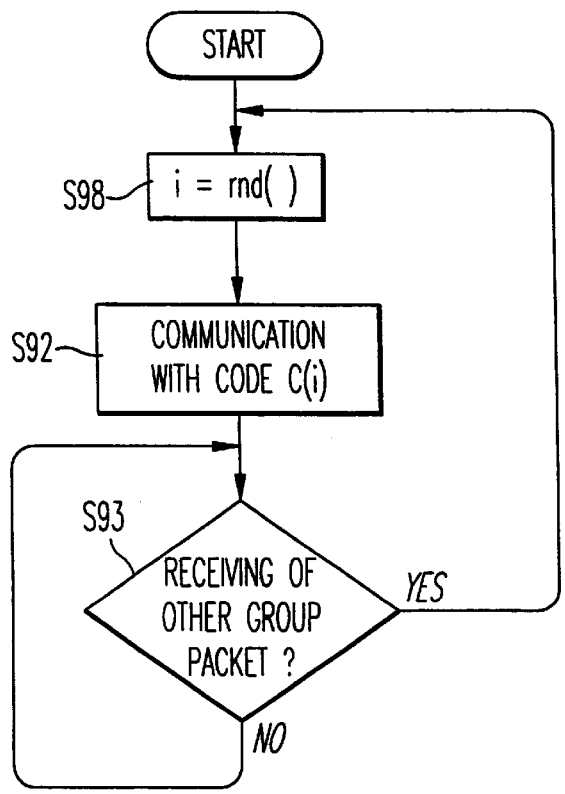
FIG. 20 is still another flowchart showing the method of selecting the pseudonoise (PN) code according to the present invention.

The fifteenth embodiment of the invention will now be explained with respect to the flowchart of FIG. 20 which shows a method for selecting the PN code. The order of changing the code in the systems of the eleventh through thirteenth embodiments is performed at random by step S98 of FIG. 20 using the rnd( ) function in step S98. Even though FIG. 20 illustrates the rnd( ) function applied to the eleventh embodiment, this teaching can also be applied to the twelfth or thirteenth embodiments. According to those systems, the probability of employing the same code as that of the other groups may become lowered.

Figure 21:
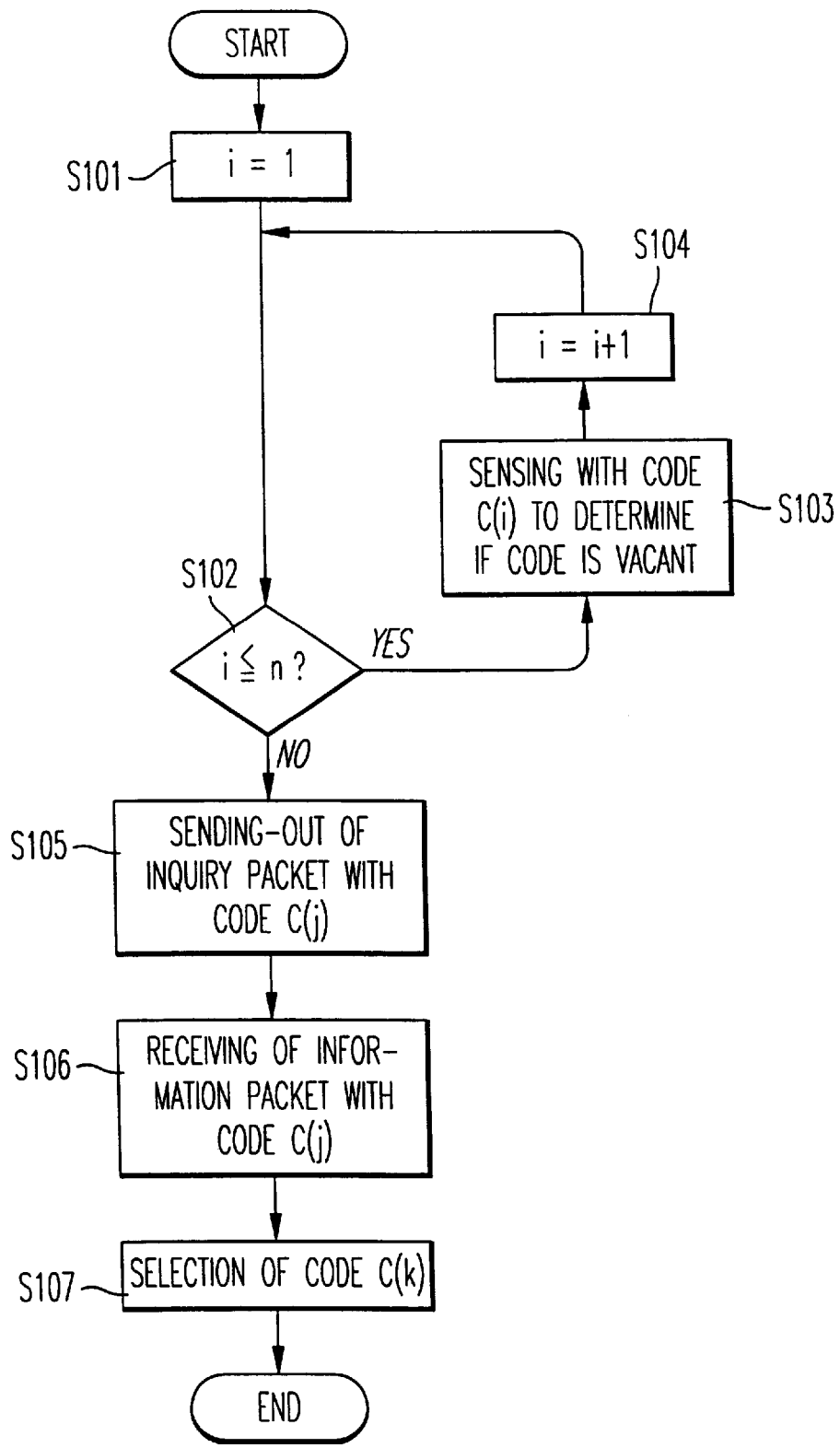
FIG. 21 is still another flowchart showing the method of selecting the pseudonoise (PN) code according to the present invention.

The sixteenth embodiment of the invention will be explained with respect to the flowchart of FIG. 21 which illustrates a method for selecting a PN code according to the present invention. First, all codes are sensed in order to determine which codes are vacant by performing steps S101, S102, S103 and S104. Thereafter, an inquiry is sent out with the codes C(j) where j=1-n in step S105. The signal format of the inquiry packet is illustrated in FIG. 22a. The "QT" field is the field of the control code which contains the inquiry code. The host terminal of the group which has already been performing communication with the code C(j) sends back a code information packet which is received in step S106.

The signal format of the code information packet is shown in FIG. 22b. The third field illustrated in FIG. 22b is the control code which contains "C1" which is the code of the information code. The fields u1, u2, etc., represent the number of codes being used. The host terminal which receives the information code containing "C1" decides the code C(k) employed together with the results sensed by the station itself. Namely, the code C(k) is decided and selected in step S107 excluding the code in the received code information being employed in addition to the code sensed by the station itself and judged that the code is being used.

Figure 23:
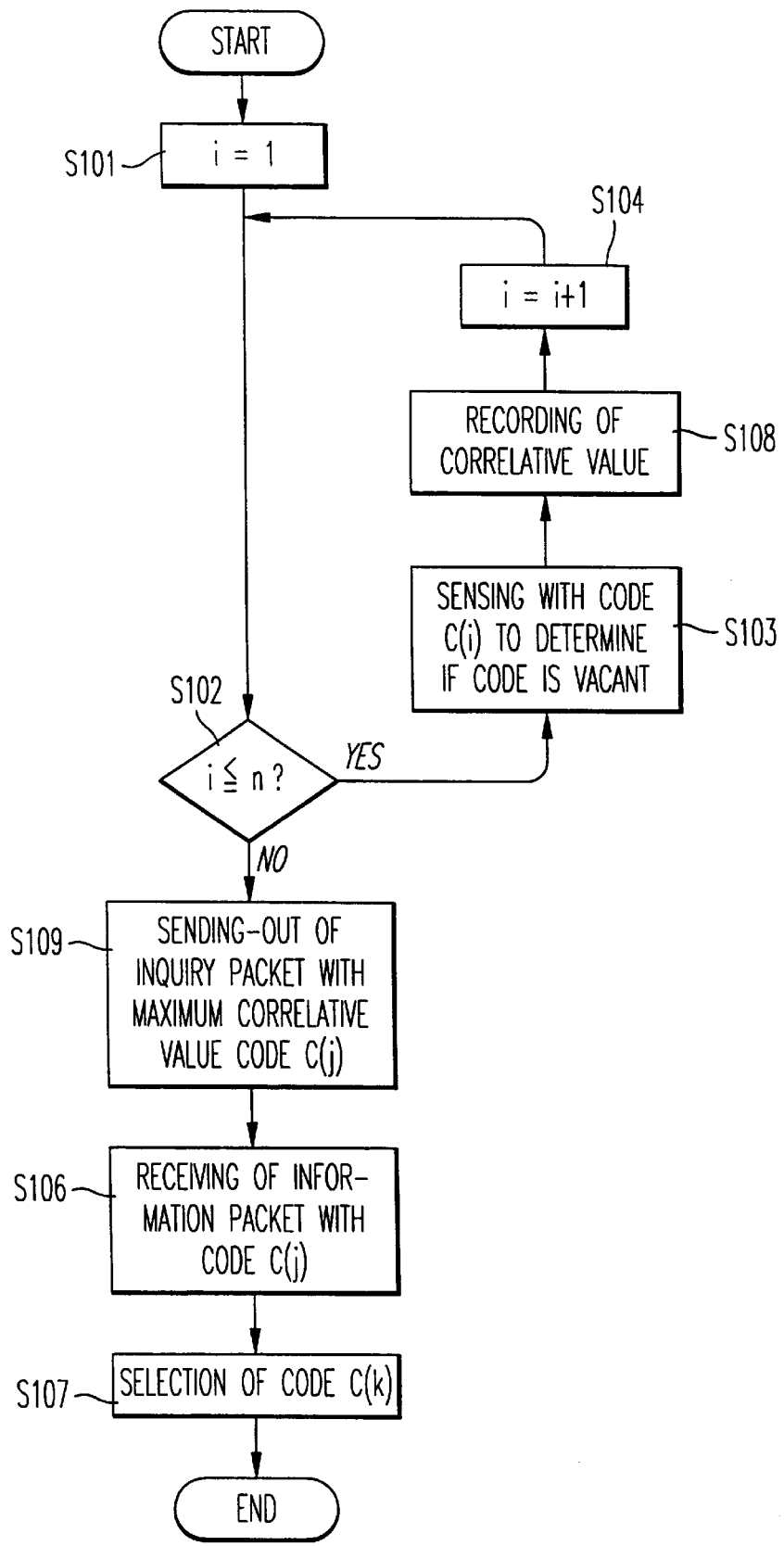
FIG. 23 is still another flowchart showing the method of selecting the PN code according to the present invention.

Next, the seventeenth embodiment of the invention is explained with respect to the flowchart illustrated in FIG. 23. Steps S101, S102, S103, S108 and S104 are performed in order to sense PN codes which are vacant. However, step S108 also stores the correlative value of the sensed code C(i). After sensing all PN codes, the inquiry packet is sent out in step S109. This inquiry packet includes the PN code C(j), j=1-n, which has a maximum correlative value and the code information packet is received in step S106. Subsequently, step S107 selects the PN code C(k) which is to be used. If the correlative value is maximum, the most preferable communication can be expected because the station is located at the nearest place. Consequently, it is possible to accurately perform the operation of transmitting/receiving the inquiry packet and the code information packet.

As is apparent from the foregoing description, the following advantageous functional effects can be expected from the present invention.

According to the first embodiment, since the confirmation packet is sent with the vacant (unused) code after sensing all codes, and thereby whether the code is employed in practice is confirmed, it is possible to surely select the vacant code.

According to the second embodiment, since the code is changed to the next vacant code in the order determined for the respective groups, the plural groups intending to start communication at the same time can avoid selecting the same code.

According to the third embodiment, since the code is changed to the next vacant code in a random order, the plural groups intending to start communication at the same time can avoid selecting the same code.

According to the fourth embodiment of the invention, since, as the operation as described in the fourth embodiment, transmission of the confirmation packet each time the code is sensed the confirmation packet is sent out, and the busy packet is received, it is not necessary to sense all codes.

According to the fifth embodiment of the invention, since at the time of changing the code, the code is changed in the order determined for the respective groups, a plurality of groups intending to start communication at the same time can avoid selecting the same code.

According to the sixth embodiment of the invention, a plurality of groups intending to start communication at the same time can avoid selecting the same code.

According to the seventh embodiment of the invention, the code of the circumferential group is made clear and thereby, the code can be selected with further certainty.

According to the eighth embodiment, the busy packet for notifying the state of being used can be received with certainty.

According to the ninth embodiment of the invention, it is not necessary to transmit the confirmation packet.

According to the tenth embodiment of the invention, the host terminals send out busy packets periodically and it is not necessary to send out the confirmation packet and the busy packet can be received with certainty.

According to the eleventh embodiment of the invention, it is not necessary to sense all of the codes.

According to the twelfth embodiment of the invention, the communication can be performed without lowering the throughput.

According to the thirteenth embodiment of the invention, it is not necessary to perform the throughput calculation and thereby, the communication can be done with certainty.

According to the fourteenth embodiment of the invention, when there exists plural stations intending to change the code in the same way, the probability of selecting the same code may be lowered.

According to the fifteenth embodiment of the invention, when there exists plural stations intending to change the code in the same way, the probability of selecting the same code may be lowered.

According to the sixteenth embodiment of the invention, it is possible to select the vacant code with certainty.

According to the seventeenth embodiment of the invention, it is possible to make an inquiry and receive the code information and thereby select the vacant code with certainty.

The invention has been described with respect to the illustrated flowcharts and hardware and system diagrams. A further description of what has already been described will be provided.

The invention includes a wireless network communication system in which plural groups optionally constructed with plural wireless terminals perform a symmetrical type of network communication between the terminals belonging to the respective groups. When the respective groups perform code-divisional multiple access network communication by use of individual pseudonoise (PN) codes, when a certain group intends to start the communication, the host terminal of the above group senses at first all of the employed pseudonoise (PN) codes, sends out a confirmation packet for confirming whether the above-mentioned codes are employed at present with the optional vacant code obtained as a result thereof. This host terminal then waits for receiving the response from the other group with the same code during a certain time interval, and starts the communication of the above code as the PN code of the group if a response is not received. On the other hand, when the response from the other group is received, the host terminal sends out the confirmation packet with the next vacant code in a similar way and waits for the response from the other group.

At the time of changing the code to the next vacant code, the code is changed in the order determined for each of the respective groups.

Further, at the time of changing the code to the next vacant code, the code may be changed in a random order.

As a different embodiment, when the host terminal senses if the code is not being used, it sends out the confirmation packet with the code and waits for receiving the response signal from the other group during a certain time period with the same code. If the host terminal does not receive the response signal from the other groups, it starts communication with the above code as the PN code. On the other hand, when the response signal from the other group is received, the signal is sensed in the same way with the next code, the confirmation packet is sent out, the operation of waiting for the response signal from the other group is repeated, and the pseudonoise code used in the group is determined.

At the time of changing the codes to determine the PN codes, the codes may be changed in a specific order assigned to the group.

Further, the order of the codes may be changed randomly for each group.

In the above described embodiments, when the other groups receiving the confirmation code or packet makes a response, the information of the code used in the circumference of the group at present is put within the response packet.

Further, when the group receiving the confirmation packet signal with the above code being used makes a response, all of the terminals in the group receiving the confirmation packet will make the response.

Alternatively, in a wireless network communication system in which plural groups having plural terminals perform a symmetrical type network communication between the wireless terminals belonging to the respective groups, when the respective groups perform network communication with a code-division multiple access by using individual pseudonoise codes, the host terminal in the other group periodically sends out a busy packet at the time when communication is not being performed and when a certain group intends to start communication, the host terminal of the above group senses the respective transmitted codes and determines whether a code is being used or not.

Further to the embodiment immediately described above, when the respective terminals in the groups do not perform communication in the group, they periodically transmit a busy packet.

As a further alternative, the invention may include a wireless network communication system in which the plural groups optionally constructed with plural terminals perform symmetrical type network communication between the terminals belonging to the respective groups when the respective groups perform network communication using a code-division multiple access method by using individual pseudonoise or spreading codes. Communication is started with a first code and when it is ascertained that another group uses this same code, the code is changed. The above code may be changed when the throughput of the n-group communication becomes smaller than a threshold value. Alternatively, the code may be changed when the frequency of the carrier sense at the time of performing the n-group communication becomes equal to or greater than a predetermined threshold. The PN codes may be tried in different orders for the different groups of terminals. Alternatively, the codes may be changed in a random order.

Alternatively, the invention may be constructed of a wireless network communication system in which plural groups having plural wireless terminals perform symmetrical network communication between wireless terminals belonging to the group. When the respective groups perform network communication with code-division multiple access by the individual pseudonoise (PN) code, the host terminal of the group firstly senses all of the used pseudonoise codes.

When the host terminal of the group judges that the other groups are performing communication, the host terminal makes an inquiry of the code being used in the circumference of the group. Further, when there exists plural codes being used which were determined by the sensing, the host terminal inquires with the code maximum correlation value.

Figure 24:
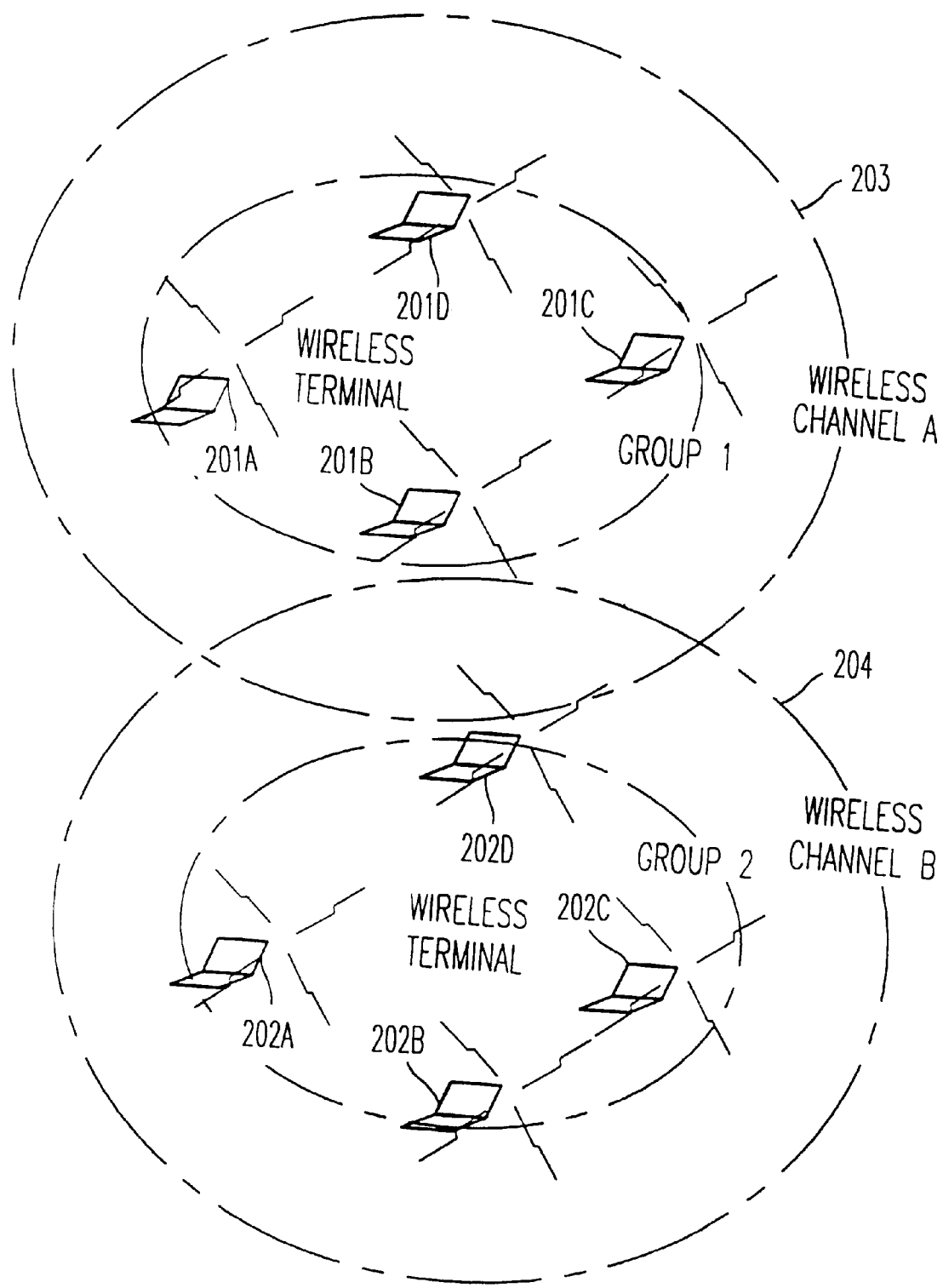
FIG. 24 is a diagram of a network communication system according to the present invention.

FIG. 24 illustrate a block diagram of a network communication system which is a wireless local area network. There is a first group of wireless terminals 201a–201d, a second group of wireless terminals 202a–202c, a wireless channel A designated by 203, and another wireless channel B designated by 204. The first group of wireless terminals 1a–1d and the second group of wireless terminals 202a–202d making up terminal groups one and two, respectively, and are not in the relationship of a base station and terminal stations, but those terminal groups construct a symmetrical type of network when communicating. A symmetrical type network is a type of Local Area Network which does not have a base station and all terminals communicating on the network have equal responsibilities for controlling communication. This may mean that each terminal only controls its own communication once the network is set up. A base station is a terminal which controls the other terminals of the group.

The terminal groups 201 and 202 including the plural wireless terminals 201a–201d and 202a–202d perform symmetrical type network communication between the respective wireless terminals belonging to the respective groups. When a group, for example group 201, performs network communication, any one of the wireless terminals 201a–201d belonging to the group 201 (called a host) detects the communication channel B being employed in the other group (group 2) and judges the vacant (unused) channel. The host terminal is not a base station but its function is simply to select a vacant channel. After the channel is selected, the host terminal does not need to perform any control over other terminals. After selecting the communication channel A as the communication channel to be employed in the present group (group 1), the selected communication channel is notified to at least the other wireless terminals belonging to the same group. At this time, the other wireless terminals confirm the communication channel to be employed in the group 1, and thereafter the terminals start the symmetrical type network communication by use of the above communication channel.

Figure 25:
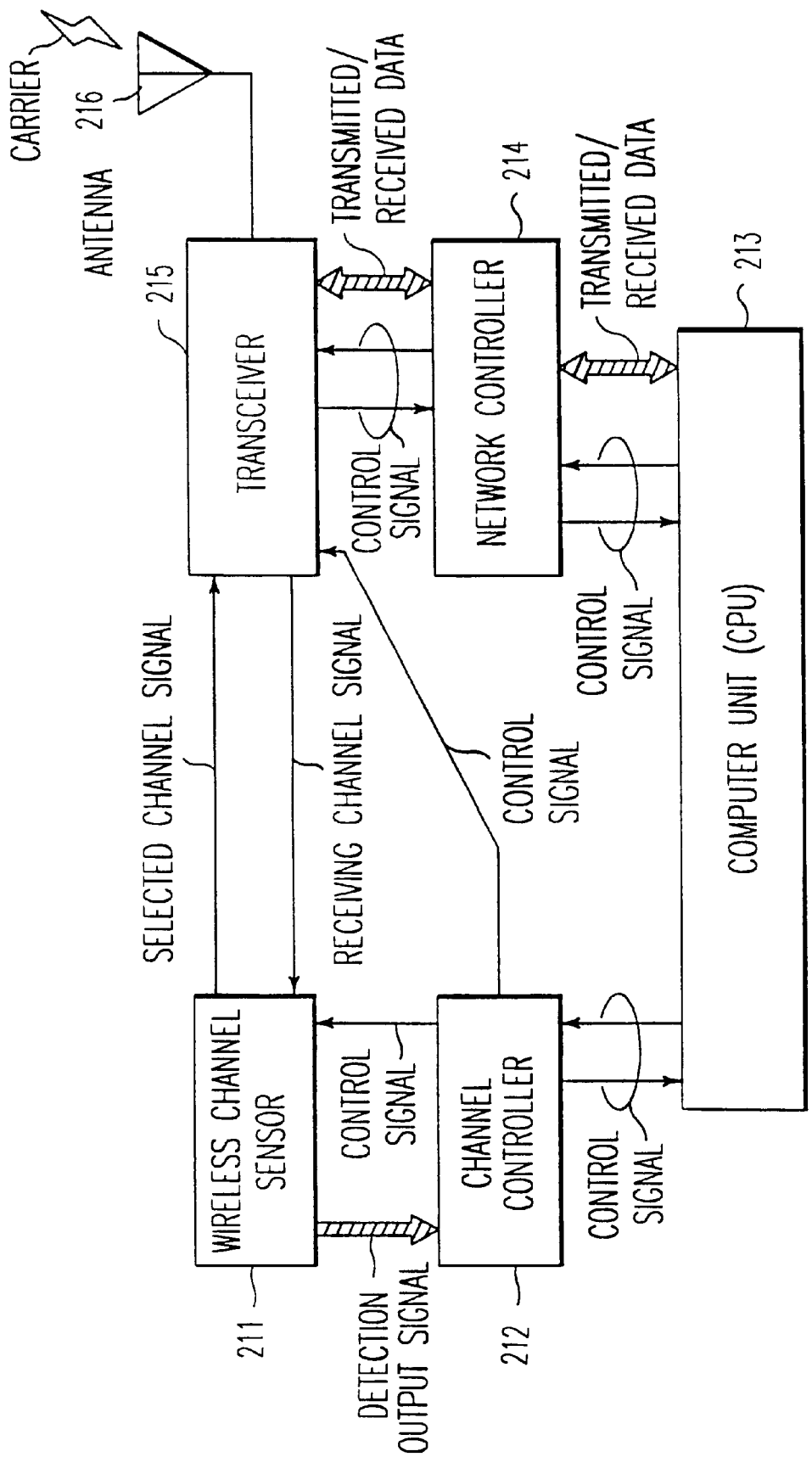
FIG. 25 is a block diagram for explaining an embodiment of a wireless terminal employed by a wireless local area network (LAN) according to the present invention.

FIG. 25 is a block diagram representing each wireless terminal illustrated in FIG. 24. Each terminal includes a wireless channel sensor 211 for detecting the presence or absence of the wireless channel being employed among the plural wireless channels, a channel controller 212 for selecting the wireless channel, a computer or microprocessor 213 for requiring and issuing the requirements of the transceiver 215 which transmits and receives over plural wireless channels, a network controller 214 for performing symmetrical type network communication, and an antenna 216.

The channel controller 212 receives an instruction to start the network communication from the computer 213, controls the wireless channel sensor 211, and starts the operation of detecting the receiver signal. The wireless channel sensor 211 detects the received signal through the transceiver 215, and detects the wireless channel employed for the received signal and as a result thereof output a detection output signal. The detection output signal is input by the channel controller 212 which determines the wireless channel for the transceiver 215, and controls the transceiver 215 so as to employ the determined channel. The channel controller 212 also notifies the computer 213 through control signals that the start of the network communication has been already prepared and thereafter the computer 213 starts the network communication through the network controller 214. The network controller 214 for instance is a CSMA/CA (Collision Avoidance) network control LSI and transmits and receives data between the transceiver 215 and the computer 213.

While the embodiment in FIG. 25 utilizes an antenna, the wireless communication can be performed using electromagnetic radio waves, light rays such as infrared light rays, or audio such as ultrasonic audio.

An example of the operation of the invention will now be provided for a mobile or portable wireless network. The mobile network may be utilized with a group participating in a conference or meeting, for example. One of the members participating in the communication takes a role of a host. The wireless terminal occupied by the host at the time of starting the conference by use of the mobile network is called the "host terminal". This "host terminal" is any one of the wireless terminals in the group and it is not always necessary for this particular host terminal to take the role of the host.

Figures 26, 27:
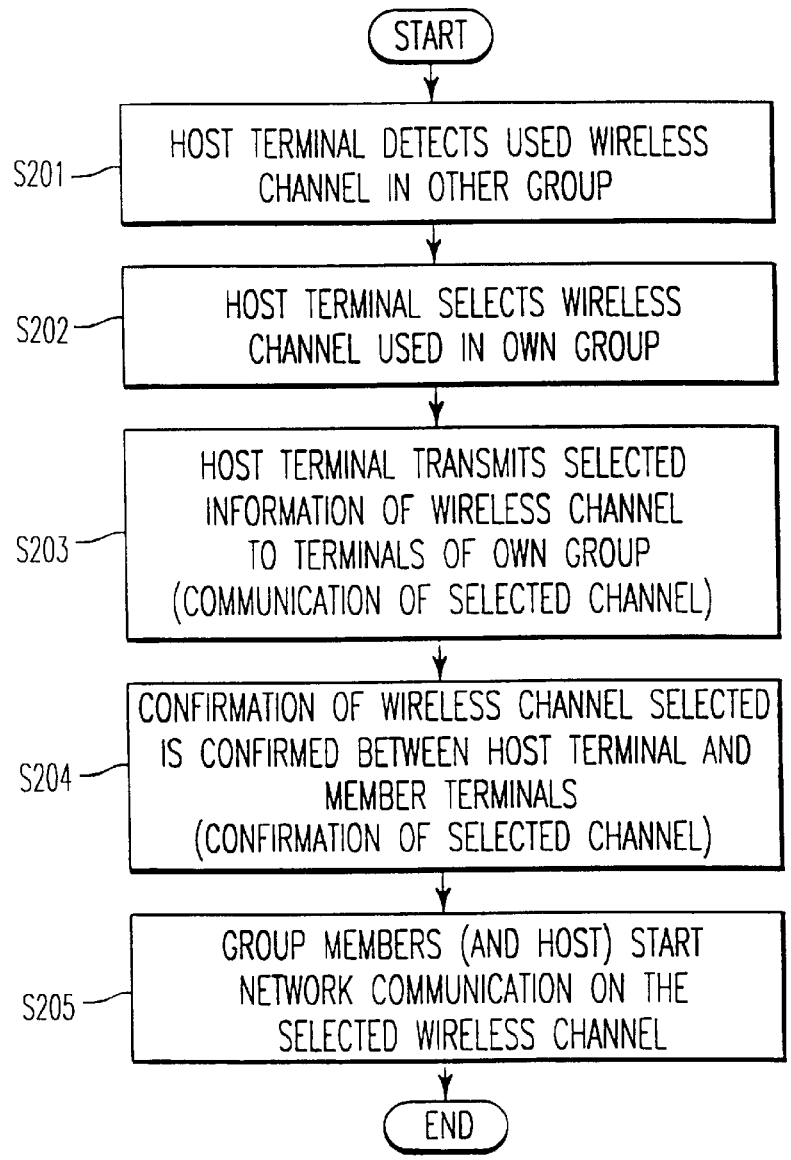
FIG. 26 is a flowchart showing a communication procedure performed when network communication using the terminal illustrated in FIG. 25.
FIG. 27 is a graph showing the relationship between the communication throughput among the members in a group and the number of the groups according to the present invention.

FIG. 26 is a flowchart showing the communication procedure performed when starting network communication using the terminal illustrated in FIG. 25. At first, the host terminal detects the wireless channel being used in other groups(s) (S201). The host terminal selects one wireless channel not being used as the wireless channel to be used in the group using its channel sensing function (S202).

Next, the host terminal transmits (notifies) the information data of the selected wireless channel to the respective members in the group (S203). The respective members confirm the wireless channel to be used in the group in accordance with the signal transmitted from the host terminal (S204). After the above-mentioned procedure, for instance, the symmetrical type network communication with CSMA is performed by use of the wireless channel selected in the group (S205).

It is possible to reduce the mutual interference between the plural groups by selecting the wireless channel with small correlation. Consequently, by employing the different wireless channels for each group, the throughput of the communication within the group can be improved against utilizing the CSMA communication by use of the single channel, as shown in FIG. 27. FIG. 27 illustrates that communication throughput remains fairly constant as the number of groups is increased.

The above-described embodiment makes it possible to provide a wireless computer network for performing plural ad-hoc network communication at the same time with different wireless channels.

The network communication system according to the above-described embodiment requires the preparation of plural small-correlation wireless channels. In the network communication system according to the nineteenth embodiment described with respect to FIG. 28, plural codes (pseudonoise) are used as the wireless channel in the system of the eighteenth embodiment.

Figure 28:
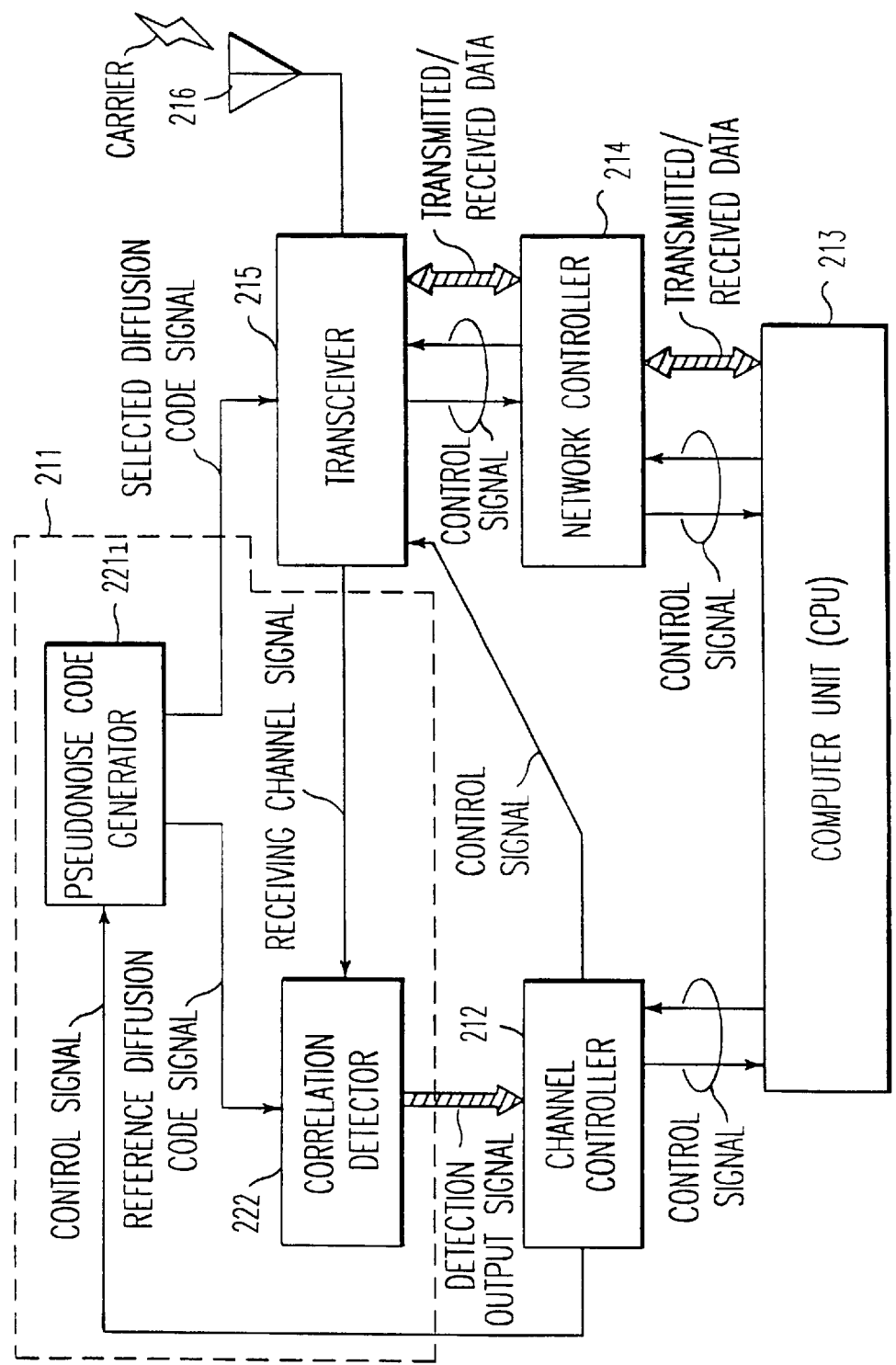
FIG. 28 is a block diagram for explaining another embodiment of the wireless terminal employed by the wireless LAN according to the present invention.

FIG. 28 is a block diagram of a wireless terminal for use in the wireless LAN according to the nineteenth embodiment of the present invention. In FIG. 28, the wireless channel sensor 211 includes a pseudonoise (PN) code generator 221, and a correlation detector 222. A description of the elements in FIG. 28 which are the same as the elements illustrated in FIG. 25 are omitted for brevity. The PN code generator 221 generates plural PN codes previously prepared. Concerning those PN codes, for instance, the period signal such as the maximum-length sequence signal is employed. As the PN codes, the codes in which the mutual correlation thereof turns out to be as small as possible are selected, for instance, just like the preferred pair of the maximum-length sequence signal. At the transceiver, the data signal to be transmitted is multiplied by one of the PN codes, and thereafter it is transmitted. The correlation detector 22 has a correlation circuit for calculating the correlation between the PN code outputted from the above-mentioned PN code generator 221 and the received signal.

In the correlation detector 222, the PN code used as the wireless channel is detected by calculating the degree (extent) of the correlation between the signal received by the transceiver 215 and the reference signal generated by the PN code generator 221 through the use of the correlation circuit. As an example, the correlation circuit is constructed with a multiplier and a low-pass filter when the received signal is a base-band signal, and the same is constructed with a mixer, a band-pass filter, and an envelope detector when the received signal is a RF signal or an intermediate frequency signal.

Furthermore, there is a method of employing a synchronous circuit such as a DLL (Delay Lock Loop). The correlation detector 222 can be constructed with a matching filter regarding the respective PN codes prepared respectively. As to the above-mentioned methods, it is permitted to adopt any method of obtaining the output of the correlation calculator by use of either one of an analog circuit or a digital circuit.

The channel controller 212 changes over the type of the reference pseudonoise code signal generated by the pseudonoise code generator 221 and receives the correlation output signal between the received signals regarding the respective codes as the output from the correlation detector 222. When the correlation output signal is below a predetermined threshold value, it is judged that the PN code can be used.

Furthermore, the PN code generator 221 is controlled such that the selected PN code signal is supplied to the transceiver 215, and the transceiver 215 is further controlled in order to transmit and receive through the use of the code. Owing to the above functions, the PN code unused is selected by the host terminal as the code used in the wireless channel of the group.

Figure 29:
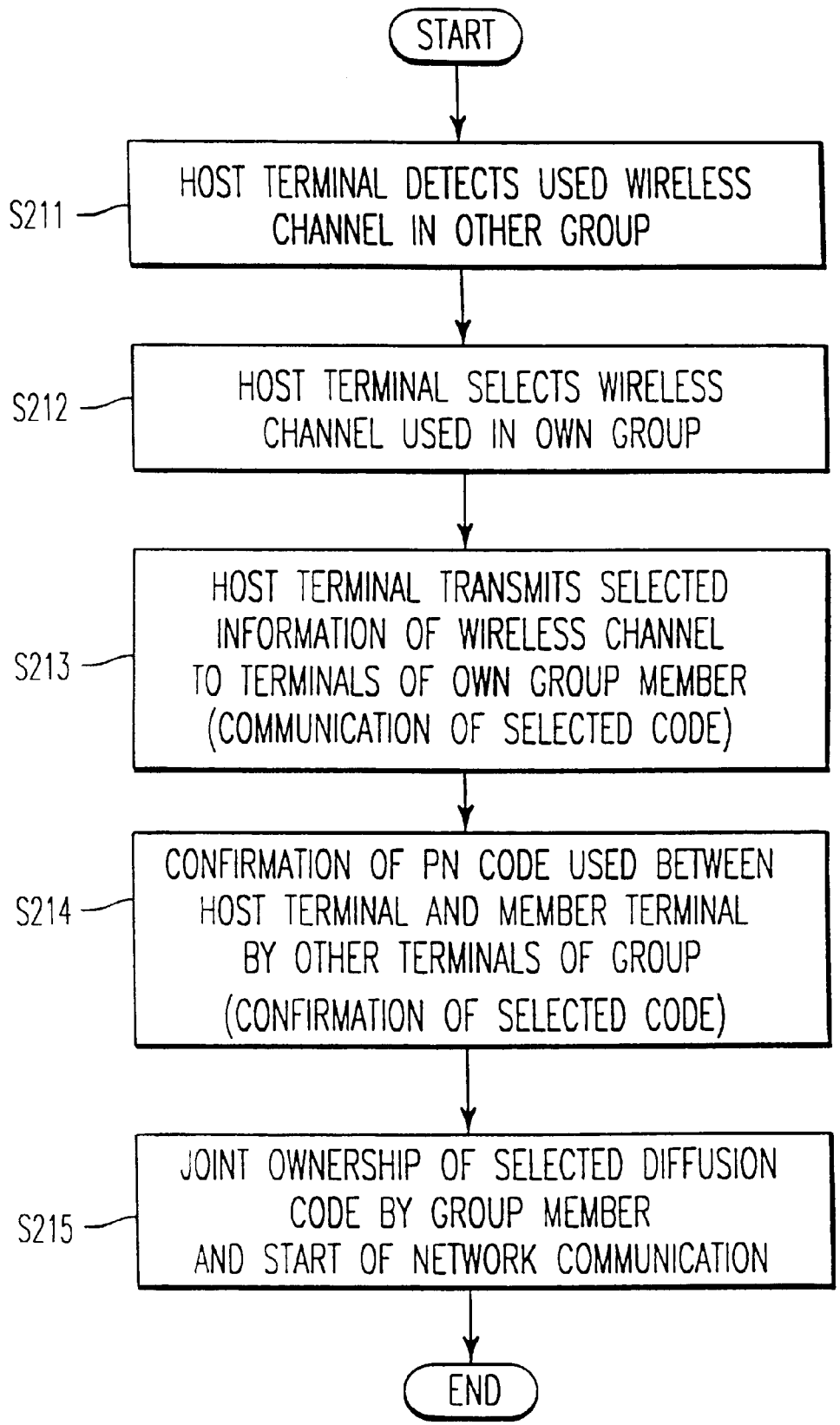
FIG. 29 is a flowchart showing a communication procedure for setting up a network using the terminal illustrated in FIG. 28.

FIG. 29 is a flowchart showing the communication procedure for forming the network using the terminal illustrated in FIG. 28. First, the host terminal detects the PN code(s) being used as the wireless channel by another group(s) (S211). The host terminal next selects one of the PN codes not used by the other group(s), assigns this PN code for use by its own group (S212) and transmits this information to other terminals of its own group (S213). The PN code to be employed in the group is then confirmed by the members of the group (S214).

After performing the above procedure, the transmitting data is multiplied by the selected PN code at the respective terminals and the same is modulated with a carrier and thereafter transmitted. For instance, the symmetrical type network communication is performed by use of CSMA (S215). However, at this time, contrary to the conventional CSMA (Carrier Sense Multiple Access), the wireless terminal does not detect the presence or absence of the carrier itself but the selected PN code selected in the group (namely, Code Sense Multiple Access). The wireless terminal transmits the data when the selected code is absent. In Code Sense Multiple Access communication, if the carrier is present but the code(s) of or relating to (modulating) the carrier is different from the code to be used by the terminal, the terminal is permitted to transmit. However, if a carrier exists but the code is the same to be used by the terminal, then the terminal will not transmit.

The nineteenth embodiment described above makes it possible to provide a wireless system based on the eighteenth embodiment which is provided with a plural code-divided wireless channel employing the carrier of sole (single) frequency as the carrier to be used for the transmission with small interference.

Figure 30:
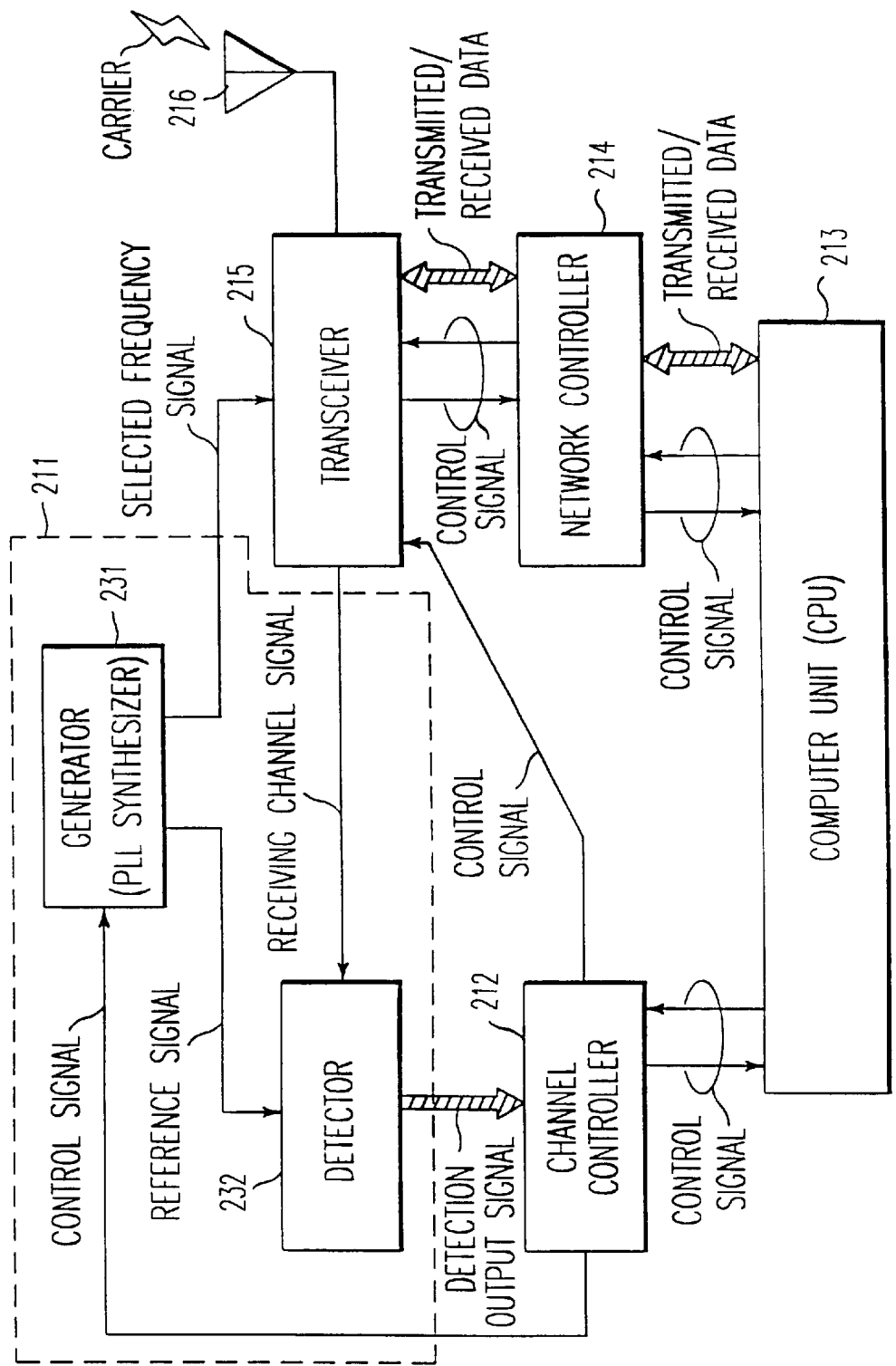
FIG. 30 is a block diagram for explaining still another embodiment of the wireless terminal employed by the wireless LAN according to the present invention.

The twentieth embodiment of the invention relates to employing plural frequency-divided wireless channels in the network system described in the eighteenth embodiment. FIG. 30 is a block diagram of the wireless terminal for use in the wireless LAN according to the twentieth embodiment. In FIG. 30, the wireless channel sensor includes a phase-locked loop (PLL) synthesizer 231 which functions as a signal generator, and a detector 232. The wireless terminals 201a–201d and 202a–202d each have a signal generator 231 for generating predetermined plural different frequencies. Since sine waves of different frequencies are orthogonal to each other, it is possible to select the wireless channels of different frequencies so as to make the mutual correlation small by a sufficiently wide frequency interval. The transceiver 215 selects one frequency from among the prepared frequencies as the carrier. It is preferably to have the influence between channels small and the mutual correlation indicates the strength of influence of the channels over each other. In the frequency divided multiple access system, small mutual correlation results when the intervals between frequencies are broad.

The detector 232 calculates the correlation between the reference signal (e.g., signal containing the PN code generated by the PN generator) and the received signal. The wireless channel sensor 211 detects the frequency of the wireless channel being employed. The detector 232 includes a mixer, a band-pass filter or plural band-pass filters corresponding to the respective frequencies, and an envelope detector. Any desired method of calculating the correlation between the received carrier signal and the reference signal may be employed. Further, the desired functions can be performed through the use of digital signal processing as opposed to individual circuit elements.

The channel controller 212 which selects the wireless channel judges that the frequency can be used when the output of the detector 232 is below a predetermined threshold value. In this process, the frequency to be employed is determined, and thereby the signal generator 231 is controlled to supply the signal of the selected frequency to the transceiver 215. Owing to these functions, the wireless channel of an unused frequency is selected by the host terminal.

Figure 31:
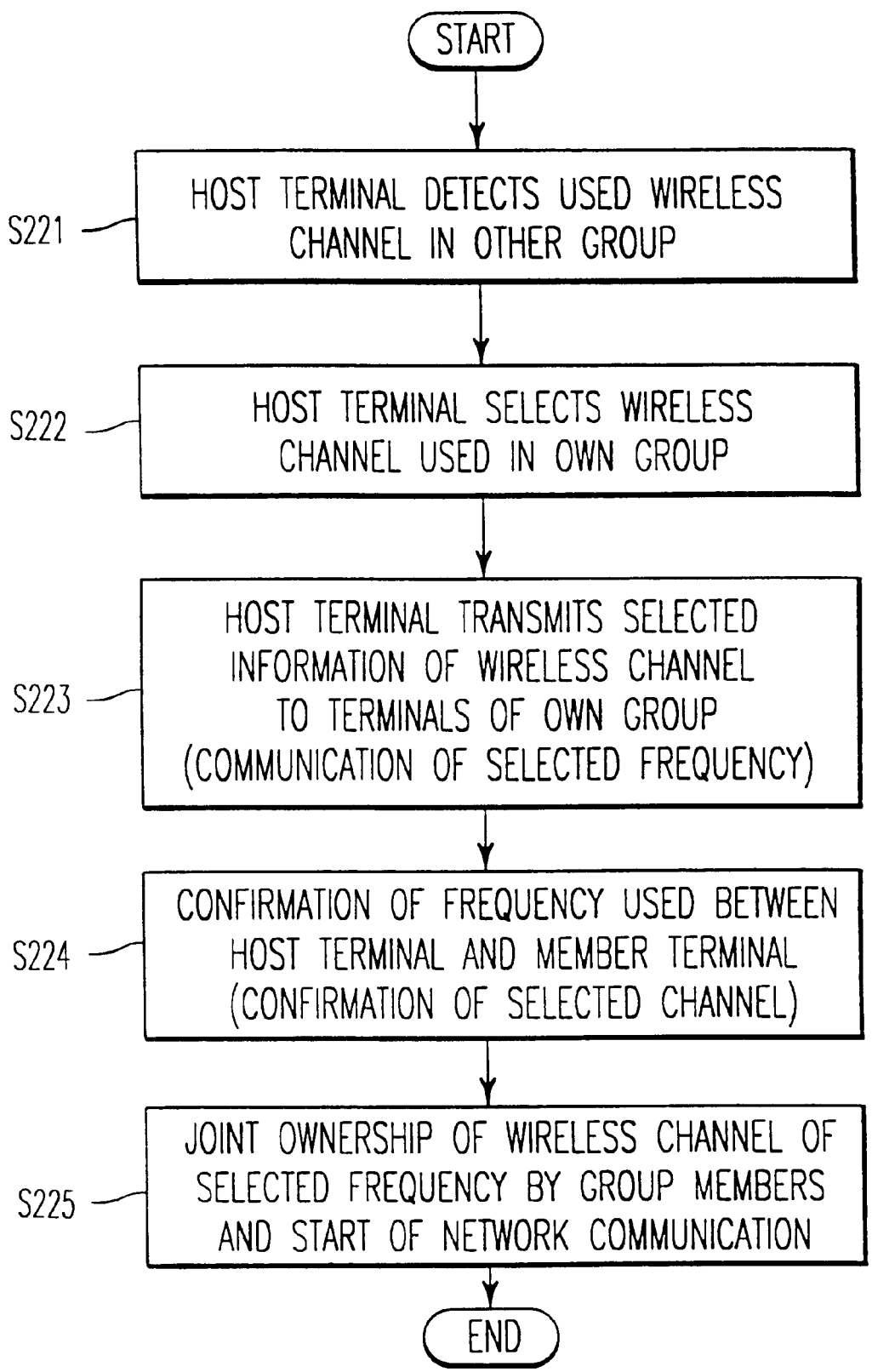
FIG. 31 is a flowchart showing a communication procedure for setting up a network using the terminal illustrated in FIG. 30.

FIG. 31 is a flowchart showing the communication procedure for setting up a network using communication terminals as illustrated in FIG. 30. At first, the host terminal detects the frequency of the wireless channel being employed by one or more other groups (S221). One of the unused frequencies is selected as the frequency of the wireless channel to be employed (S222). Next, the host terminal transmits (notifies) the selected frequency to the members of the group (S223). The respective members confirm the frequency to be employed by the group (S224). After this procedure, in the group the selected carrier is modulated by the data to be transmitted and subsequently transmitted. For instance, symmetrical type network communication with CSMA is performed (S225).

The twentieth embodiment described above makes it possible to provide a wireless system based on the eighteenth embodiment which is provided with plural frequency-divided wireless channels with very small interference.

The present invention is used, for example, in an ad-hoc network, also referred to herein as a mobile network which allows plural users to go out from different or the same location and meet. During the meeting, the network is constructed (mutually) in order to perform symmetrical wireless communication. This differs from conventional wireless networks in which computers are stationed in a fairly static office environment.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A wireless network communication method using at least two groups of wireless terminals, comprising the steps of:
   communicating using a sub-band of a frequency band by a first group of the wireless terminals;
   determining, by a terminal of a second group of terminals, information defining how sub-bands of the frequency band are to be used by the second group of wireless terminals;
   notifying, by said terminal, other terminals of the second group of said information;
   communicating, by the second group of terminals, on a sub-band of said frequency band in accordance with said information when there is an absence of a signal from the first group of wireless terminals on the sub-band being used by the second group of terminals.

2. A method according to claim 1, further comprising, performed before said step of determining information, the step of:
   determining a vacancy and use of sub-bands of the frequency band, by the terminal of the second group of the wireless terminals,
   wherein the step of determining information is performed using a result of the analyzing step.

3. A method according to claim 2, wherein said determining step of determining the vacancy and use comprises:
   determining the vacancy and use of sub-bands by analyzing communications on the sub-bands of the frequency band.

4. A method according to claim 1, further comprising the step of:
   acknowledging the selected channel by the other terminals of the second group.

5. A method of communicating by a first group of terminals, comprising the steps of:
   transmitting, by the host terminal of the first group, an inquiry code requesting information indicating at least one spreading code used by another group of terminals;
   receiving information indicating the at least one spreading codes being used;
   selecting a spreading code to be used by the first group using the information which was received; and
   communicating by the first group using spread spectrum communication in accordance with the spreading code which has been selected.

6. A method according to claim 5, further comprising, performed before the transmitting step, the step of:

sensing, by a host terminal of the first group, spreading codes which are vacant and available for use by the first group.

7. A method according to claim 5, wherein:

said step of transmitting an inquiry includes transmitting an inquiry using a spreading code having a maximum correlation magnitude.

8. A method according to claim 5, wherein:

said step of selecting a spreading code comprises selecting a pseudonoise (PN) code; and said step of communicating comprises communicating by the first group using code-division multiple access communication using the spreading code which has been selected.

9. A wireless network communication system using at least two groups of wireless terminals, comprising:

means for communicating, using a sub-band of a frequency band, by a first group of the wireless terminals;

means for determining, by a terminal of a second group of wireless terminals, information defining how sub-bands of the frequency band are to be used by the second group of wireless terminals;

means for notifying, by said terminal, other terminals of the second group of said information; and means for communicating, by the second group of terminals, on a sub-band of said frequency band in accordance with said information when there is an absence of a signal from the first group of wireless terminals on the sub-band being used by the second group of terminals.

10. A system according to claim 9, further comprising:

means for determining a vacancy and use of sub-bands of the frequency band, by a terminal of a second group of the wireless terminals, wherein the means for determining information operates using a result of the analyzing step.

11. A system according to claim 10, wherein said means for determining the vacancy and use comprises:

means for determining the vacancy and use of sub-bands by analyzing communications on the sub-bands of the frequency band.

12. A system according to claim 9, further comprising the step of:

acknowledging the selected channel by the other terminals of the second group.

13. A system for communicating by a first group of terminals, comprising:

means for transmitting, by the host terminal of the first group, an inquiry code requesting information indicating at least one spreading code used by another group of terminals;

means for receiving information indicating the at least one spreading codes being used;

means for selecting a spreading code to be used by the first group using the information which was received; and means for communicating by the first group using spread spectrum communication in accordance with the spreading code which has been selected.

14. A system according to claim 13, further comprising:

means for sensing, by a host terminal of the first group, spreading codes which are vacant and available for use by the first group.

15. A system according to claim 13, wherein:

said means for transmitting an inquiry includes means for transmitting an inquiry using a spreading code having a maximum correlation magnitude.

16. A system according to claim 13, wherein:

said means for selecting a spreading code comprises means for selecting a pseudonoise (PN) code; and said means for communicating comprises means for communicating by the first group using code-division multiple access communication using the spreading code which has been selected.

* * * * *

UNITED STATES PATENT AND TRADEMARK OFFICE
CERTIFICATE OF CORRECTION

PATENT NO.    : 6,400,752 B1
DATED         : June 4, 2002
INVENTOR(S)   : Suzuki et al.

It is certified that error appears in the above-identified patent and that said Letters Patent is hereby corrected as shown below:

<u>Title page,</u>
The Terminal Disclaimer has been omitted. Item [45] and the Notice Information should read:

-- [45] Date of Patent: *Jun. 4, 2002 --

-- [*] Notice: Subject to any disclaimer, the term of this patent is extended or adjusted under 35 U.S.C. 154(b) by 0 days.

This patent is subject to a terminal disclaimer --

Signed and Sealed this

Thirtieth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,400,752 B1
DATED : June 4, 2002
INVENTOR(S) : Suzuki et al.

It is certified that error appears in the above-identified patent and that said Letters Patent is hereby corrected as shown below:

<u>Title page,</u>
Item [45] and Item [*] Notice, should read:

-- [45] **Date of Patent: *Jun. 4, 2002** --

-- [*] Notice: Subject to any disclaimer, the term of this
Patent is extended or adjusted under 35
U.S.C. 154(b) by 0 days.

This patent is subject to a terminal disclaimer --

Signed and Sealed this

Thirteenth Day of April, 2004

JON W. DUDAS
*Acting Director of the United States Patent and Trademark Office*